(12) United States Patent
Nakatsugawa

(10) Patent No.: US 8,744,461 B2
(45) Date of Patent: Jun. 3, 2014

(54) TRANSMITTING APPARATUS AND RECEIVING APPARATUS

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2 days.

(21) Appl. No.: 13/081,851

(22) Filed: Apr. 7, 2011

(65) Prior Publication Data

US 2011/0195736 A1     Aug. 11, 2011

Related U.S. Application Data

(63) Continuation of application No. PCT/JP2008/068680, filed on Oct. 15, 2008.

(51) Int. Cl.
*H04W 72/00* (2009.01)
*H04W 72/04* (2009.01)

(52) U.S. Cl.
CPC .................... *H04W 72/04* (2013.01)
USPC ........ 455/450; 455/451; 455/452.1; 455/453; 455/454; 455/455; 370/315; 370/316; 370/317; 370/318; 370/319

(58) Field of Classification Search
USPC ............... 455/450–455, 68, 69, 70, 522, 515, 455/516; 370/328–330, 318
See application file for complete search history.

(56) References Cited

U.S. PATENT DOCUMENTS

| | | | |
|---|---|---|---|
| 8,107,428 B2 * | 1/2012 | Chong et al. | ................... 370/329 |
| 8,428,011 B2 | 4/2013 | Inoue et al. | |
| 2002/0018453 A1 * | 2/2002 | Yu et al. | ..................... 370/333 |
| 2005/0128993 A1 | 6/2005 | Yu et al. | |
| 2006/0153131 A1 * | 7/2006 | Kang et al. | ..................... 370/329 |
| 2008/0095106 A1 | 4/2008 | Malladi et al. | |
| 2008/0159427 A1 * | 7/2008 | Kang et al. | ..................... 375/260 |
| 2009/0147872 A1 * | 6/2009 | Chong et al. | .................. 375/260 |
| 2010/0067463 A1 * | 3/2010 | Masaoka | ....................... 370/329 |
| 2010/0177713 A1 | 7/2010 | Yoshii et al. | |
| 2010/0290407 A1 * | 11/2010 | Uemura | ........................ 370/329 |

FOREIGN PATENT DOCUMENTS

| | | |
|---|---|---|
| CN | 1625164 | 6/2005 |
| CN | 101267252 | 9/2008 |
| EP | 2051409 | 4/2009 |
| JP | 2008-236018 | 10/2008 |
| JP | 2008-236426 | 10/2008 |
| WO | 2008/014275 | 1/2008 |
| WO | 2008/018462 | 2/2008 |
| WO | 2008/026461 | 3/2008 |

OTHER PUBLICATIONS

International Search Report issued for corresponding International Patent Application No. PCT/JP2008/068680, mailed Dec. 9, 2008.

(Continued)

*Primary Examiner* — Fayyaz Alam
(74) *Attorney, Agent, or Firm* — Myers Wolin, LLC

(57) ABSTRACT

A transmitting apparatus selects any one of areas included in a transmission area of a first signal used for a first process, and transmits the first signal by using the selected area. The area is selected according to a type of information to be transmitted among a plurality of types of information capable of being transmitted to a receiving apparatus. The receiving apparatus receives the first signal transmitted by the transmitting apparatus, and performs a second process by using information according to the area in which the first signal is received.

10 Claims, 21 Drawing Sheets

(56) References Cited

OTHER PUBLICATIONS

IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society; Sponsored by LAN/MAN Standards Committee; IEEE Std 802.16e-2005 and IEEE Std 802.16-2004/Cor1-2005 (Amendment and Corrigendum to IEEE Std 802.16-2004); Dated Feb. 28, 2006.

IEEE Standard for Local and metropolitan area networks; Part 16: Air Interface for Fixed and Mobile Broadband Wireless Access Systems; IEEE Computer Society and the IEEE Microwave Theory and Techniques Society; Sponsored by LAN/MAN Standards Committee; IEEE Std 802.16-2004 (Revision of IEEE 802.16-2001); Dated Oct. 1, 2004.

Notification of the First Office Action issued for corresponding Chinese Patent Application No. 2008801315266, issued Apr. 1, 2013 with English translation.

Office Action issued for corresponding Japanese Patent Application No. 2010-533755, issued on Mar. 12, 2013 with an English translation.

\* cited by examiner

| SLOT NUMBER | REQUEST SIZE (Byte) |
|---|---|
| 0 | 0 |
| 1 | 100 |
| 2 | 200 |
| ⋮ | ⋮ |
| 14 | 1400 |
| 15 | 1500 |

OFFSET=0

| SLOT NUMBER | CQI(BINARY) |
|---|---|
| 0 | 0b0000 |
| 1 | 0b0001 |
| 2 | 0b0010 |
| ⋮ | ⋮ |
| 14 | 0b1110 |
| 15 | 0b1111 |

OFFSET=1

| SLOT NUMBER | CQI(BINARY) |
|---|---|
| 1 | 0b0000 |
| 2 | 0b0001 |
| 3 | 0b0010 |
| ⋮ | ⋮ |
| 15 | 0b1110 |
| 0 | 0b1111 |

⋯⋯ (OFFSET=2~14)

OFFSET=15

| SLOT NUMBER | CQI(BINARY) |
|---|---|
| 15 | 0b0000 |
| 0 | 0b0001 |
| 1 | 0b0010 |
| ⋮ | ⋮ |
| 13 | 0b1110 |
| 14 | 0b1111 |

TRANSMITTING APPARATUS AND RECEIVING APPARATUS

This application is a continuing application, filed under 35 U.S.C. §111(a), of International Application PCT/JP2008/068680, filed on Oct. 15, 2008.

FIELD

The embodiment discussed herein is related to a transmitting apparatus and a receiving apparatus.

BACKGROUND

Radio communication systems have been widely used today, including cellular phone systems and wireless local area networks (wireless LANs). In such a radio communication system, various control signals or control parameters in addition to user data may be transmitted and received between communication apparatuses. The control signals or control parameters permit the communication apparatus to control radio communication.

For example, there is performed a process in which a mobile station transmits a ranging code to a base station, and the base station controls transmission power and transmission timing of the mobile station based on a received result of the ranging code. Further, there is performed a process in which a mobile station informs the base station of information indicating a measurement result of radio quality, and the base station determines a modulation scheme of user data based on the measurement result. In addition, there is performed a process in which a mobile station transmits information indicating a band request to the base station, and the base station allocates a radio resource to the mobile station according to the band request (e.g., refer to the following two literatures).

(1) The Institute of Electrical and Electronics Engineers (IEEE), "IEEE Standard for Local and Metropolitan Area Networks Part 16: Air Interface for Fixed Broadband Wireless Access Systems", IEEE802.16-2004.

(2) The Institute of Electrical and Electronics Engineers (IEEE), "IEEE Standard for Local and Metropolitan Area Networks Part 16: Air Interface for Fixed and Mobile Broadband Wireless Access Systems", IEEE802.16e-2005.

However, when the above-described various control sets are performed individually, a number of control signals or control parameters are transmitted and received between communication apparatuses. Therefore, a number of radio resources are consumed. As a result, radio resources allocatable for transmitting and receiving user data are reduced to thereby cause a decrease in a throughput of radio communication.

SUMMARY

According to one aspect of the present invention, this transmitting apparatus includes a processor configured to select any one of areas included in a transmission area of a first signal used for a first process; and a radio interface configured to transmit the first signal by using the area selected by the processor, wherein the processor performs the selection according to a type of information to be transmitted among a plurality of types of information capable of being transmitted to a transmission partner of the first signal.

The object and advantages of the invention will be realized and attained by means of the devices and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates a second data structure example of the slot definition table;
FIG. 19 illustrates a third data structure example of the slot definition table.

DESCRIPTION OF EMBODIMENTS

Preferred embodiments of the present invention will be described below with reference to the accompanying drawings.

Figure 1:
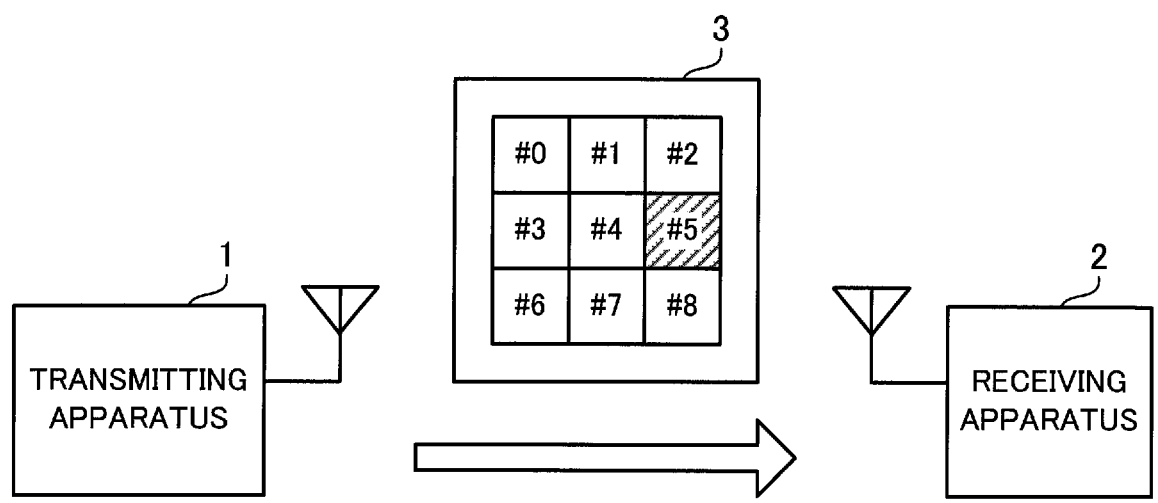
FIG. 1 illustrates a transmitting apparatus and a receiving apparatus.

FIG. 1 illustrates a transmitting apparatus and a receiving apparatus. In this communication system, the transmitting apparatus 1 can transmit signals by using a transmission area 3. The receiving apparatus 2 can receive the signals transmitted from the transmitting apparatus 1 via the transmission area 3. The transmission area 3 includes a plurality of areas. In an example of FIG. 1, nine areas of the areas #0 to #8 are included.

The transmitting apparatus 1 transmits signals by using any one of the areas #0 to #8 included in the transmission area 3, thereby transmitting information to the receiving apparatus 2. When associating radio quality with the areas #0 to #8, for example, the transmitting apparatus 1 can transmit the radio quality measured by itself to the receiving apparatus 2 through the area for transmitting signals. Further, when associating band sizes with the areas #0 to #8, the transmitting apparatus 1 can transmit a band request to the receiving apparatus 2 through the area for transmitting the signals. In addition, the association may be previously determined statistically, or the transmitting apparatus 1 or the receiving apparatus 2 may determine the association dynamically.

On that occasion, the transmitting apparatus 1 can also transmit a signal used for a predetermined process as a signal to be transmitted by any one of the areas #0 to #8. In the case of considering a ranging process, for example, the transmitting apparatus 1 can transmit a ranging code by any one of the areas #0 to #8. In other words, through the transmission area 3 for transmitting signals used for a first process, the transmitting apparatus 1 can also transmit information for a second process except the first process to the receiving apparatus 2.

The receiving apparatus 2 determines whether to receive a signal from the transmitting apparatus 1 through any one of the areas #0 to #8 included in the transmission area 3. Then, the receiving apparatus 2 designates information transmitted from the transmitting apparatus 1 according to the determined area. For example, when associating the radio quality with the areas #0 to #8, the receiving apparatus 2 can designate the radio quality measured by the transmitting apparatus 1, and control a modification scheme applied to the transmitting apparatus 1. Further, when associating the band sizes with the areas #0 to #8, the receiving apparatus 2 can designate contents of the band request from the transmitting apparatus 1, and control a band allocation to the transmitting apparatus 1.

On that occasion, the receiving apparatus 2 can perform another process by using the signal received by any one of the areas #0 to #8. When receiving the ranging code, for example, the receiving apparatus 2 can control a transmission power or transmission timing of the transmitting apparatus 1 based on the received result of the ranging code. In other words, the receiving apparatus 2 can receive from the transmitting apparatus 1 information for the second process except the first process through the transmission area 3 for receiving the signals used for the first process from the transmitting apparatus 1.

In addition, a plurality of transmitting apparatuses including the transmitting apparatus 1 can share the transmission area 3. In that case, a signal capable of identifying each transmitting apparatus is considered to be used as a signal for transmission in the transmission area 3. The signal capable of identifying each transmitting apparatus may be previously determined statistically, or allocated by the receiving apparatus 2 dynamically. Even when signals of the plurality of transmitting apparatuses are transmitted from the same area, the receiving apparatus 2 can also discriminate the signal from each transmitting apparatus. For the purpose of preventing a deviation in the areas used for transmission, the association between the areas #0 to #8 and information to be transmitted may be different depending upon the transmitting apparatus.

According to the above-described transmitting apparatus 1, any one of the areas #0 to #8 is selected and a signal is transmitted corresponding to information to be transmitted to the receiving apparatus 2. Further, according to the receiving apparatus 2, information transmitted from the transmitting apparatus 1 is determined corresponding to the area in which a signal from the transmitting apparatus 1 is received. This process permits the transmitting apparatus 1 to effectively transmit information to the receiving apparatus 2. For example, a radio resource amount to be used is suppressed, and throughput of the communication between both the apparatuses is improved.

Through broadcast information, the receiving apparatus 2 may be considered to inform the transmitting apparatus 1 of a plurality of transmission areas as the transmission area of the signal used for the first process. The transmitting apparatus 1 transmits the first signal used for the first process through the predetermined transmission area (e.g., the transmission area specified to the transmitting apparatus 1 by the receiving apparatus 2) among the plurality of informed transmission areas. Further, the transmitting apparatus 1 can also transmit the signal (e.g., the same signal as the first signal) used for the second process through the remaining transmission areas except the predetermined transmission area among the plurality of informed transmission areas. On the other hand, when receiving signals through the predetermined transmission area among the plurality of transmission areas, the receiving apparatus 2 is considered to perform the first process, and perform the second process when receiving the signal through the remaining transmission areas except the predetermined transmission area. That is, also in the transmission area used for the first process (e.g., the ranging process), the remaining transmission areas except the predetermined transmission area can be used for the second process (e.g., information for the radio quality or the band request).

Next, a case where the aforementioned communication method is applied to an uplink of a mobile communication system, namely, a transmitting method of the transmitting apparatus 1 is applied to a mobile station and a receiving method of the receiving apparatus 2 is applied to a base station will be further described in detail. Note that the aforementioned communication method can also be applied to a downlink and further other types of communication systems such as a fixed wireless communication system.

First Embodiment

Figure 2:
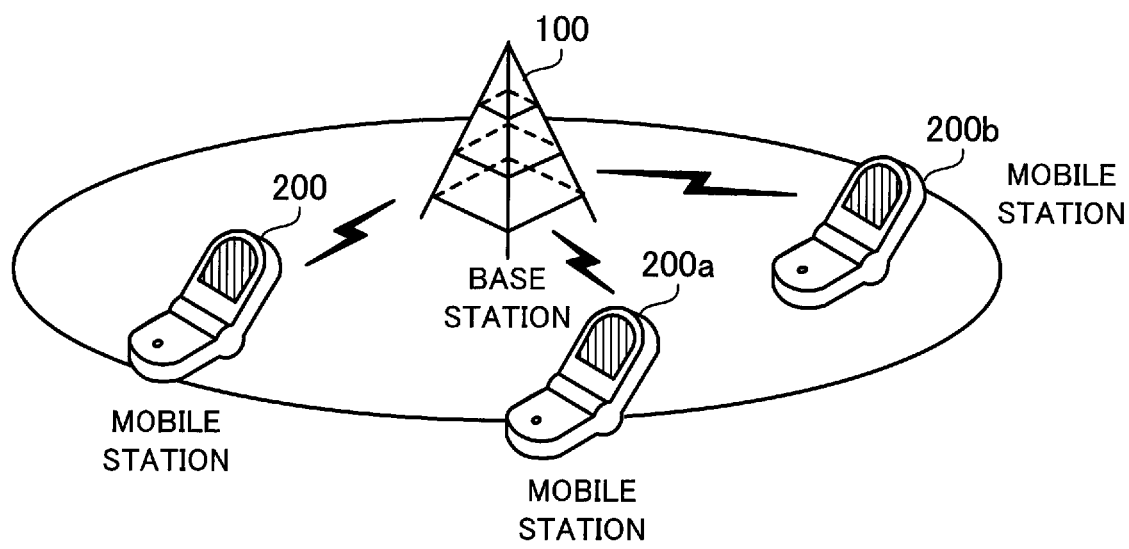
FIG. 2 illustrates a system configuration of a mobile communication system.

FIG. 2 illustrates a system configuration of the mobile communication system. The mobile communication system according to a first embodiment includes a base station 100 and mobile stations 200, 200*a*, and 200*b*.

The base station 100 is a wireless communication equipment capable of communicating wirelessly with the mobile stations 200, 200*a*, and 200*b*. The base station 100 transmits data addressed to the mobile stations 200, 200*a*, and 200*b* via a downlink (radio link in the direction from the base station 100 to the mobile stations 200, 200*a*, and 200*b*). Further, the base station 100 receives data transmitted by the mobile stations 200, 200*a*, and 200*b* via an uplink (radio link in the direction to the base station 100 from the mobile stations 200, 200*a*, and 200*b*). In addition, the base station 100 can also communicate with a host station (not illustrated) (e.g., a wireless network controller) or other base stations.

The mobile stations 200, 200*a*, and 200*b* are wireless terminal devices capable of communicating wirelessly with the base station 100. The mobile stations 200, 200*a*, and 200*b* are, for example, cellular phones. The mobile stations 200, 200*a*, and 200*b* transmit data to the base station 100 via an uplink. Further, the mobile stations 200, 200*a*, and 200*b* receive data addressed to themselves from the base station 100 via the downlink.

Here, the mobile communication system according to the first embodiment mainly performs the control of radio communication on the side of the base station 100. That is, the base station 100 controls transmission power and transmission timing of the mobile stations 200, 200*a*, and 200*b*. Further, the base station 100 controls a modulation scheme according to radio quality of the downlink measured by the mobile stations 200, 200*a*, and 200*b*. Further, the base station 100 allocates an uplink radio resource based on a band request from the mobile stations 200, 200*a*, and 200*b*.

The base station 100 and the mobile stations 200, 200*a*, and 200*b* can communicate wirelessly with each other, for example, in accordance with the IEEE 802.16 standard. As a communication system, an orthogonal frequency division multiple access (OFDMA) is considered to be used. Note that other communication systems may be used.

Figure 3:
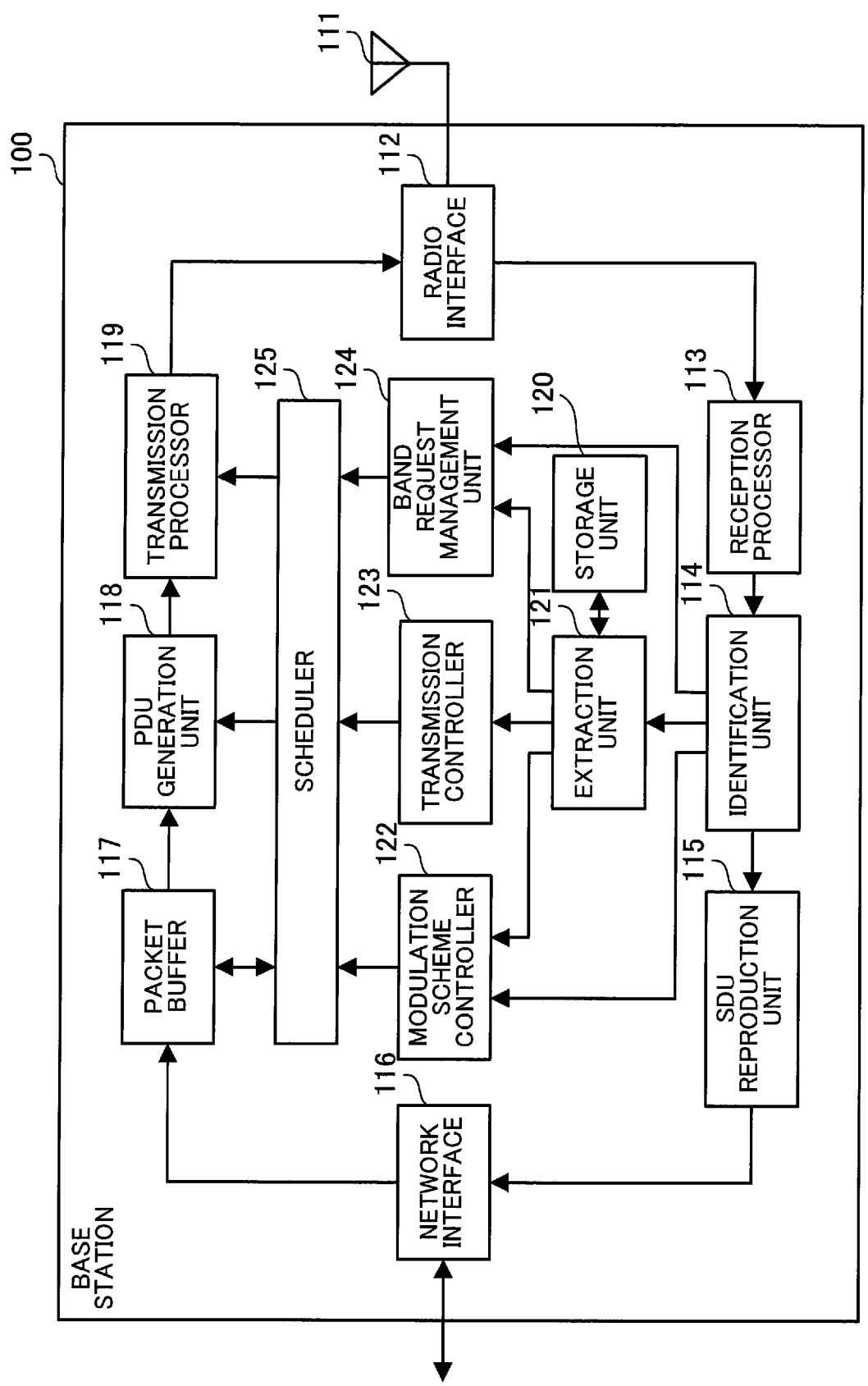
FIG. 3 is a block diagram illustrating a base station.

FIG. 3 is a block diagram illustrating the base station. The base station 100 has an antenna 111, a radio interface 112, a reception processor 113, an identification unit 114, a service data unit (SDU) reproduction unit 115, a network interface 116, a packet buffer 117, a PDU generation unit 118, a transmission processor 119, a storage unit 120, an extraction unit 121, a modulation scheme controller 122, a transmission controller 123, a band request management unit 124, and a scheduler 125.

The antenna 111 is an antenna used for transmission/reception. The antenna 111 produces a radio signal received from the mobile stations 200, 200a, and 200b to the radio interface 112. Further, the antenna 111 wirelessly outputs a transmit signal acquired from the radio interface 112. Note that a transmitting antenna and a receiving antenna may be provided separately.

The radio interface 112 performs a radio signal process. Specifically, the radio interface 112 converts a received signal acquired from the antenna 111 into a digital base band signal and supplies it to the reception processor 113. On the other hand, the radio interface 112 converts a digital base band transmit signal acquired from the transmission processor 119 into a radio output signal, and supplies it to the antenna 111. For the radio signal process, the radio interface 112 has, for example, a power amplifier, a frequency converter, a band pass filter (BPF), an analog to digital (A/D) converter, and a digital to analog (D/A) converter.

The reception processor 113 extracts an uplink subframe included in a radio frame from the received signal acquired from the radio interface 112, and demodulates and decodes it. A decoding process includes de-interleave, an error correction, and an error detection. In the demodulation scheme and the decoding method, those previously determined statistically are also used and those adaptively selected are also used. Then, the reception processor 113 supplies the acquired-decoded data to the identification unit 114.

The identification unit 114 separates user data and control parameters included in the decoded data acquired from the reception processor 113 from each other. Then, the identification unit 114 supplies the user data to the SDU reproduction unit 115. Further, the unit 114 supplies channel quality indicators (CQIs) indicating a downlink radio quality among the control parameters to the modulation scheme controller 122, and at the same time, supplies a band request to the band request management unit 124. Further, the unit 114 supplies to the extraction unit 121 a signal of an area (ranging area) for transmitting a ranging code included in the uplink subframe.

The SDU reproduction unit 115 acquires the user data from the identification unit 114. Then, the unit 115 transforms a data format from a protocol data unit (PDU) being a packet form of a radio block to an SDU being a packet form of a communication block between itself and the host station or another base station. On that occasion, the unit 115 divides or packs a packet and removes a medium access control (MAC) header or a cyclic redundancy check (CRC), if necessary. Then, the unit 115 supplies the SDU packet to the network interface 116.

The network interface 116 is a communication interface for performing a packet communication with a host station or another base station. The network interface 116 transmits the SDU packet acquired from the SDU reproduction unit 115 to the host station or the another base station. On the other hand, the network interface 116 supplies to the packet buffer 117 the SDU packet addressed to the mobile stations 200, 200a, and 200b received from the host station or the another base station.

The packet buffer 117 is a buffer memory that temporarily holds the SDU packets acquired from the network interface 116. In the packet buffer 117, the SDU packets are classified according to a destination address and a connection ID. Then, the packet buffer 117 sequentially supplies the held SDU packets to the PDU generation unit 118 according to an instruction from the scheduler 125.

The PDU generation unit 118 acquires the SDU packets from the packet buffer 117, and at the same time, acquires various control parameters from the scheduler 125. While controlling the SDU packets and the control parameters so as to be appropriately arranged in a radio frame, the unit 118 converts the SDU packet into the PDU packet. On that occasion, the unit 118 adds a MAC header or a CRC to the SDU packet and performs the division or packing of packets, if necessary. Then, the unit 118 supplies the PDU packets and the control parameters to the transmission processor 119.

The transmission processor 119 acquires user data of a PDU format and the control parameters from the PDU generation unit 118, and performs coding and modulation of them to thereby produce a radio frame. The coding process includes a burden of an error detection parity, an error correction coding, and interleave. As the coding system, for example, a convolution coding or turbo coding is used. As the modulation scheme, for example, a quadrature phase shift keying (QPSK) or 16 quadrature amplitude modulation (QAM) is used. The modulation scheme is controlled by the scheduler 125. Then, the transmission processor 119 supplies transmit signals of the radio frame to the radio interface 112.

The storage unit 120 stores information indicating a correspondence relationship between an area (slot) included in the ranging area and its meaning. The information indicating the correspondence relationship may be previously defined statistically, or produced and updated dynamically. In the first embodiment, the slots and the CQIs indicating a downlink radio quality are supposed to be associated with each other. Also, the unit 120 stores information indicating a correspondence relationship between the allocated ranging codes and the mobile stations 200, 200a, and 200b. The ranging codes may be allocated statistically or dynamically.

The extraction unit 121 acquires a signal of the ranging area from the identification unit 114, and extracts the ranging code transmitted by the mobile stations 200, 200a, and 200b. On that occasion, the unit 121 refers to the information stored in the storage unit 120, and designates the mobile station as a transmission source. At the same time, the unit 121 designates a meaning corresponding to the slot used for transmitting the ranging code. Then, the unit 121 notifies the modulation scheme controller 122 or the band request management unit 124 of the designated mobile station and the meaning, according to the meaning. Suppose that in the first embodiment, the unit 121 notifies the modulation scheme controller 122 of the designated mobile station and CQIs. Further, the unit 121 designates a received power level and received timing of the ranging code, and notifies the transmission controller 123 of that designation.

The modulation scheme controller 122 determines the modulation scheme of the user data addressed to the mobile stations 200, 200a, and 200b based on the CQIs acquired from the identification unit 114 or the extraction unit 121. For the purpose of adaptively determining the modulation scheme, the controller 122 previously holds, for example, information indicating a correspondence relationship between the downlink radio quality and the usable modulation scheme. Then, the controller 122 notifies the scheduler 125 of the modulation scheme applied to each mobile station.

The transmission controller 123 compares the received power level and received timing notified from the extraction unit 121 with the preferable received power level and received timing. Further, the controller 123 produces a control parameter for causing the mobile stations 200, 200a, and 200b to change the transmission power and the transmission timing. For example, when the received power level from the mobile station 200 is lower than the preferable received power level, the controller 123 produces a control parameter for causing the mobile station 200 to raise up the transmission power. Then, the controller 123 supplies the produced control parameter to the scheduler 125.

The band request management unit 124 manages an allocation of the uplink radio resource to the mobile stations 200, 200a, and 200b. When acquiring a band request from the identification unit 114 (or the extraction unit 121), the unit 124 designates a size (e.g., the number of bytes) of the requested radio resource, and allocates it to a request source. Then, the unit 124 notifies the scheduler 125 of the allocation conditions of the uplink radio resource.

The scheduler 125 manages an allocation of the downlink radio resource. The scheduler 125 confirms the SDU packet expected to be transmitted and held by the packet buffer 117, and performs an allocation to the downlink subframe included in the radio frame. Further, the scheduler 125 produces allocation information of the downlink subframe and the uplink subframe. Then, the scheduler 125 supplies various control parameters to the PDU generation unit 118.

One example of a hardware configuration of the base station will be described. The base station includes a radio interface, a processor, a memory, a logic circuit, and a wired interface. The radio interface is an interface device that communicates wirelessly with the mobile station. The processor is a device that processes data, and examples thereof include a central processing unit (CPU) and a digital signal processor (DSP). The memory is a device that stores data, and examples thereof include a read only memory (ROM) and a random access memory (RAM). The logic circuit is an electronic circuit that performs a logic operation, and examples thereof include a large scale integration (LSI) and a field-programming gate array (FPGA). The wired interface is an interface device that performs wired communication with other base stations connected to the network (so-called backhaul network) on the wired interface side of a cellular phone system.

A correspondence relationship between hardware and the base station 100 illustrated in FIG. 3 is, for example, as follows. The radio interface corresponds, for example, to the antenna 111 and the radio interface 112. The processor and the logic circuit correspond, for example, to the reception processor 113, the identification unit 114, the SDU reproduction unit 115, the packet buffer 117, the PDU generation unit 118, the transmission processor 119, the extraction unit 121, the modulation scheme controller 122, the transmission controller 123, the band request management unit 124, and the scheduler 125. The memory corresponds, for example, to the storage unit 120. The wired interface corresponds, for example, to the network interface 116.

Figure 4:
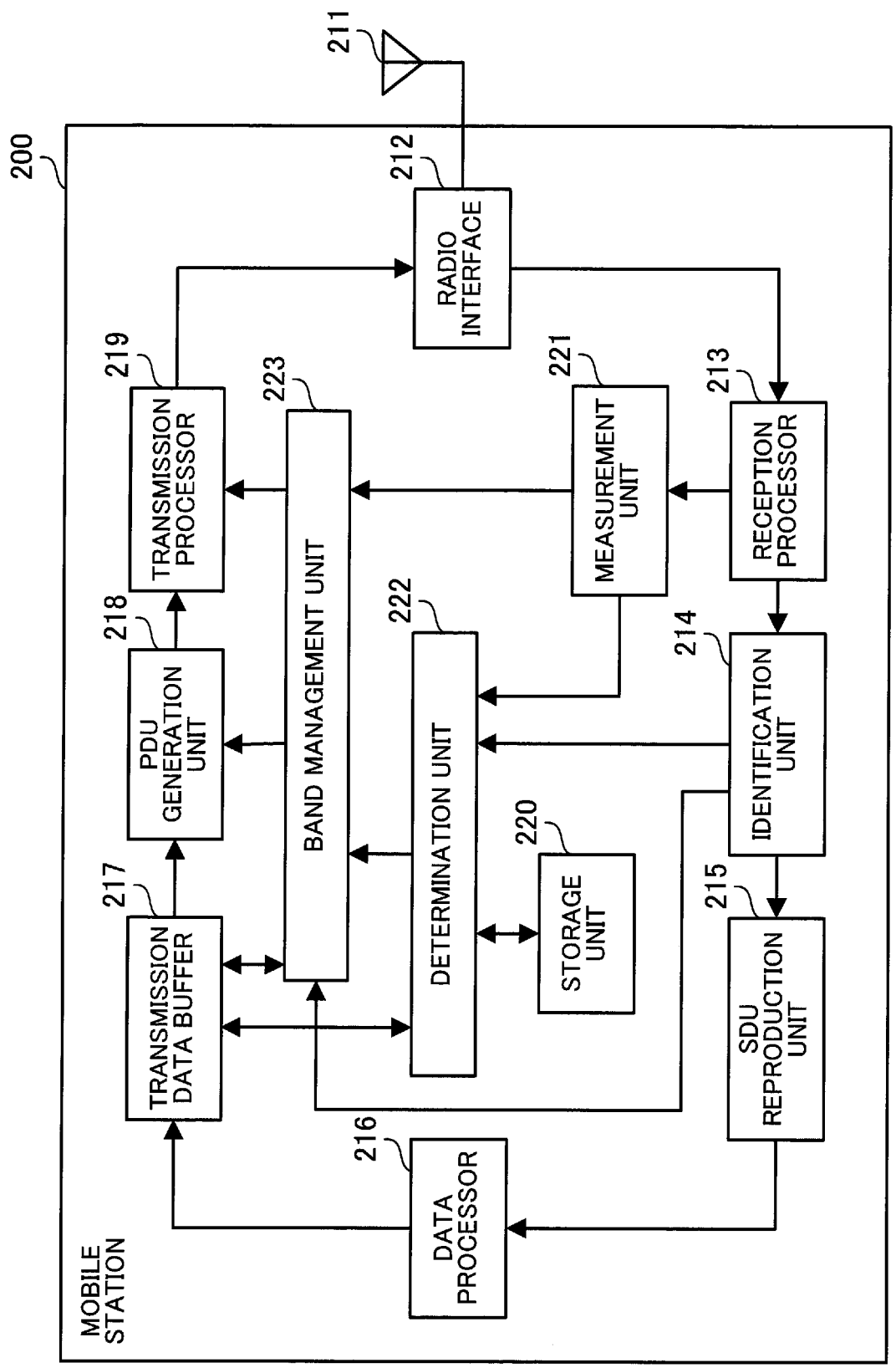
FIG. 4 is a block diagram illustrating a mobile station.

FIG. 4 is a block diagram illustrating the mobile station. The mobile station 200 has an antenna 211, a radio interface 212, a reception processor 213, an identification unit 214, an SDU reproduction unit 215, a data processor 216, a transmission data buffer 217, a PDU generation unit 218, a transmission processor 219, a storage unit 220, a measurement unit 221, a determination unit 222, and a band management unit 223. In addition, the mobile stations 200a and 200b can also be realized by using the same module configuration as that of the mobile station 200.

Here, functions of the antenna 211, the radio interface 212, the reception processor 213, the identification unit 214, the SDU reproduction unit 215, the PDU generation unit 218, and the transmission processor 219 are the same as those of the antenna 111, radio interface 112, reception processor 113, identification unit 114, SDU reproduction unit 115, PDU generation unit 118, and transmission processor 119 of the aforementioned base station 100, respectively.

The data processor 216 performs data processing by using the SDU packets acquired from the SDU reproduction unit 215. In the data processor 216, for example, various application programs for reproducing audio data or displaying video data are executed. Further, the data processor 216 produces the SDU packets if necessary, and supplies them to the transmission data buffer 217.

The transmission data buffer 217 is a buffer memory that temporarily holds the SDU packets acquired from the data processor 216. The transmission data buffer 217 sequentially produces the held SDU packets to the PDU generation unit 218 according to an instruction from the band management unit 223.

The storage unit 220 stores information indicating the correspondence relationship between the slot included in the ranging area and its meaning. This information is the same as that stored in the storage unit 120 of the base station 100. The information indicating the correspondence relationship may be previously defined statistically, or received from the base station 100. Suppose that in the first embodiment, the slots and the CQIs indicating the downlink radio quality are associated with each other.

The measurement unit 221 acquires a preamble signal from the reception processor 213, and measures the downlink radio quality. As an index of the radio quality, for example, a carrier to interference and noise ratio (CINR) is considered to be used. Then, the unit 221 maps the measurement results to the CQIs, and notifies the determination unit 222 and the band management unit 223 of that mapping.

The determination unit 222 refers to the information stored in the storage unit 220, and determines whether to transmit the ranging code by using any one of the slots included in the ranging area. The slot is determined based on the CQIs notified by the measurement unit 221 or the quantity of the SDU packets expected to be transmitted and held by the transmission data buffer 217. Suppose that in the first embodiment, the slot is selected according to the CQIs of the downlink radio quality. Further, the unit 222 acquires from the identification unit 214 the ranging code allocated to itself or control parameters indicating the timing to be transmitted. Then, the unit 222 requests the band management unit 223 to transmit the ranging code.

The band management unit 223 acquires from the identification unit 214 the control parameters indicating the uplink radio resource allocated to the mobile station 200, and controls the mapping of the PDU packets and the control parameters to the radio frame. Further, the unit 223 confirms the SDU packet expected to be transmitted and held by the transmission data buffer 217, and produces the control parameters indicating a band request to thereby supply them to the PDU generation unit 218.

Further, the band management unit 223 controls a process of informing the base station 100 of the CQIs acquired by the measurement unit 221. Specifically, when informing the base station 100 of the CQIs along with the ranging process, the unit 223 instructs the transmission processor 219 to transmit the ranging codes according to a request from the determination unit 222. On the other hand, when informing the base station 100 of the CQIs separately from the ranging process, the unit 223 produces to the PDU generation unit 218 the control parameters indicating the CQIs acquired from the measurement unit 221. As described later, the unit 223 can also perform a band request along with the ranging process.

One example of a hardware configuration of the mobile station will be described. The mobile station includes a radio interface, a processor, a memory, a logic circuit, an input interface, and an output interface. The radio interface is an interface device that communicates wirelessly with the base station. The processor is a device that processes data, and examples thereof include a central processing unit (CPU) and a digital signal processor (DSP). The memory is a device that stores data, and examples thereof include a read only memory (ROM) and a random access memory (RAM). The logic circuit is an electronic circuit that performs a logic operation, and examples thereof include a large scale integration (LSI) and a field-programming gate array (FPGA). The input interface is a device that performs an input operation, and examples thereof include a manual operation button and a microphone. The output interface is a device that performs an output operation, and examples thereof include a display and a speaker.

A correspondence relationship between hardware and the mobile station 200 illustrated in FIG. 4 is, for example, as follows. The radio interface corresponds, for example, to the antenna 111 and the radio interface 112. The processor, the memory, and the logic circuit correspond, for example, to the reception processor 213, the identification unit 214, the SDU reproduction unit 215, the data processor 216, the transmission data buffer 217, the PDU generation unit 218, the transmission processor 219, the measurement unit 221, the determination unit 222, and the band management unit 223. The memory corresponds, for example, to the storage unit 220.

Figure 5:
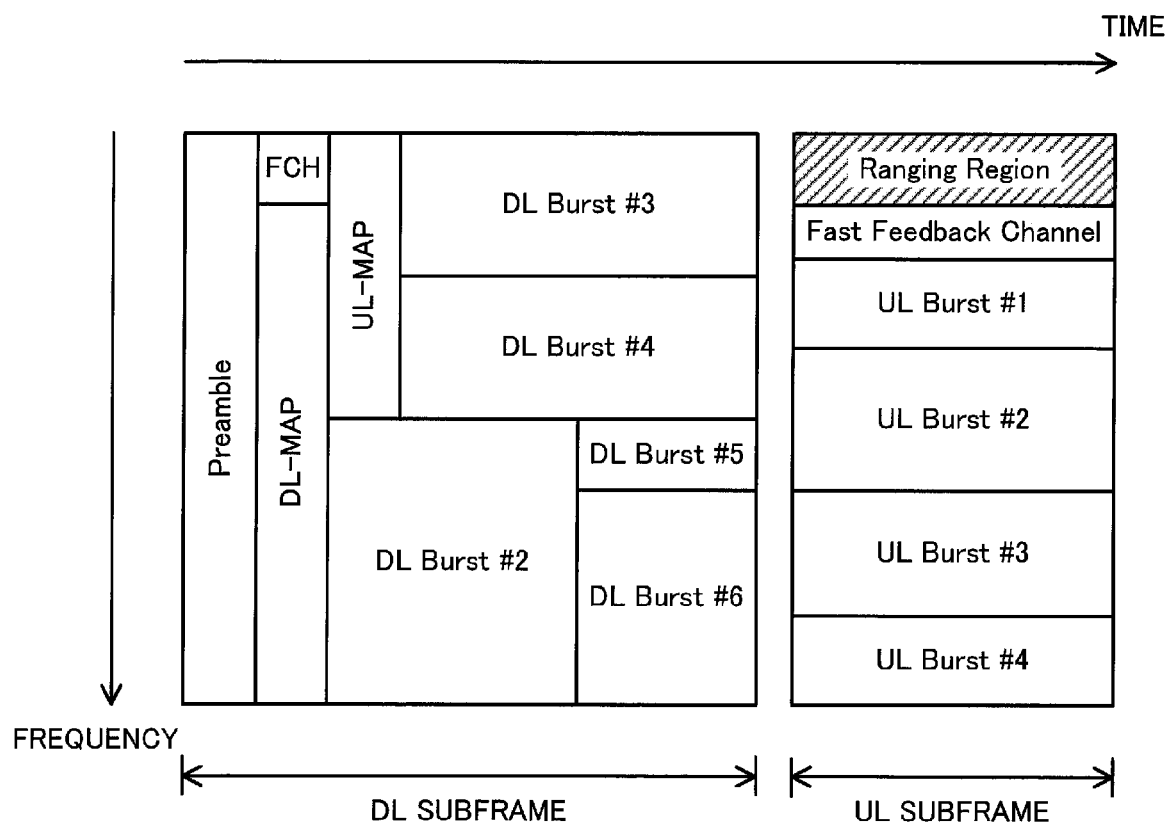
FIG. 5 illustrates a radio frame structure example.

FIG. 5 illustrates a radio frame structure example. The radio frame illustrated in FIG. 5 is used for radio communication between the base station 100 and the mobile stations 200, 200a, and 200b. The horizontal axis represents the time direction, and the vertical axis represents the frequency direction. As a minimum unit in the time direction, the symbol is used, and as a minimum unit in the frequency direction, the subchannel is used. In this example, a time division duplex (TDD) is used as a multiplex system of the uplink and the downlink. The radio frame includes a downlink (DL) subframe in the first half, and an uplink (UL) subframe in the second half.

In the DL subframe, a Preamble, a frame control header (FCH), a DL-MAP, an UL-MAP, and a downlink burst (DL Burst) are included. The Preamble includes a known signal for identifying a head of the radio frame. The FCH is information for recognizing the DL-MAP. The DL-MAP illustrates an allocation state of radio resources of the downlink subframe. The UL-MAP illustrates an allocation state of radio resources of the uplink subframe. In the DL burst, the user data and control parameters addressed to the mobile stations 200, 200a, and 200b can be transmitted.

In the uplink subframe, a ranging region, a fast feedback channel, and an uplink burst (UL Burst) are included. In the ranging region, the ranging code can be transmitted. In the Fast Feedback Channel, the mobile stations 200, 200a, and 200b can transmit the control parameters (e.g., CQIs) fed back to the base station 100 by themselves. In the UL burst, the user data and control parameters can be transmitted. In addition, the ranging region or the feedback channel may be set in every frame, or in every several frames.

A type of the ranging includes an initial ranging performed at the time of connecting the mobile stations 200, 200a, and 200b to the base station 100, and a periodic ranging performed thereafter. In the ranging area, a usable area in each ranging type may be separated, or a usable area common to a plurality of ranging types may be provided.

Figure 6:
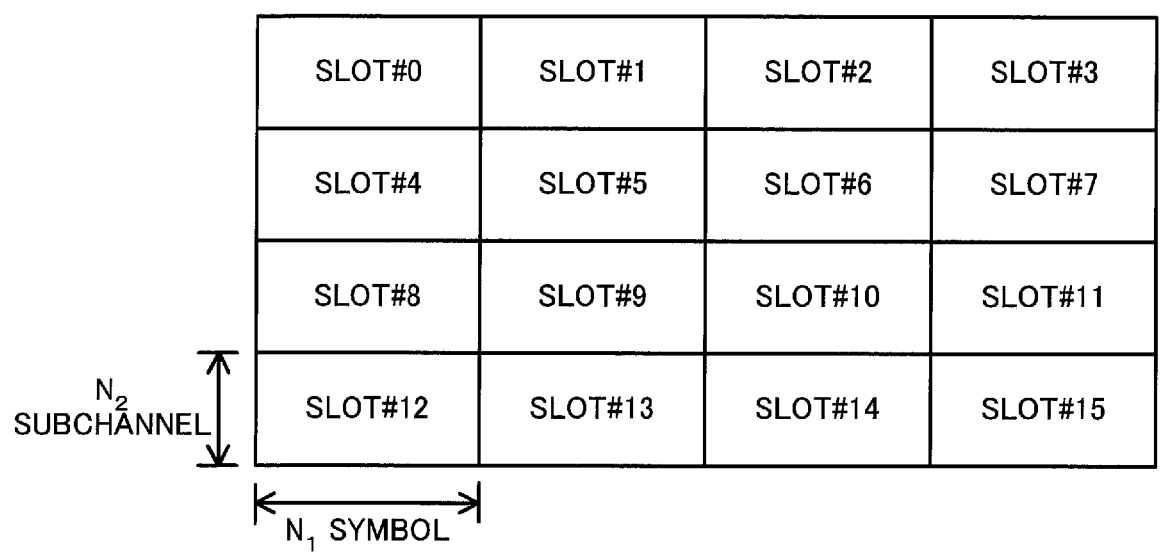
FIG. 6 illustrates a first structure example of a ranging area.

FIG. 6 illustrates a first structure example of the ranging region. In this example, 16 slots of slots #0 to #15 are included in the ranging region. Each slot is a radio resource designated by $N_1$ symbols (e.g., two symbols) and $N_2$ subchannels (e.g., one subchannel). The number of the slots provided in the ranging region, or the number of the symbols in each slot and the number of the subchannels in each slot can be arbitrarily set by the base station 100.

The mobile stations 200, 200a, and 200b each can select any one of the slots #0 to #15 and transmit the ranging code allocated to itself. As the ranging code, for example, a code division multiple access (CDMA) code is used. That is, the ranging codes of a plurality of mobile stations may be code-multiplexed and transmitted in one slot. In the slot, other signals except the ranging code may be included and transmitted.

Suppose that in the present embodiment, the slots as illustrated in FIG. 6 are formed within the periodic ranging area. Along with the periodic ranging, various control parameters are considered below to be transmitted from the mobile stations 200, 200a, and 200b to the base station 100. Note that the various control parameters can also be transmitted from the mobile stations to the base station by using another region for the ranging type.

Figure 7:
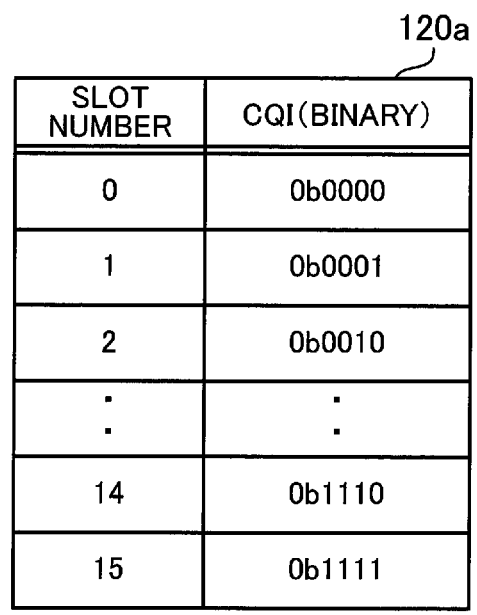
FIG. 7 illustrates a first data structure example of a slot definition table.

FIG. 7 illustrates a first data structure example of a slot definition table. The slot definition table 120a is stored in the storage unit 120 of the base station 100. In addition, the same table as the slot definition table 120a is stored also in the storage unit 220 of the mobile station 200. On the slot definition table 120a, items of the slot number and the CQI are provided.

In the item of the slot number, a number for identifying the slot formed in the ranging region is set. In the item of the CQI, a four-bit bit-string corresponding to measurement results of the downlink radio quality is set. A bit string in which the measurement results are directly represented (e.g., '0000'=−10 dB, '0001'=−8 dB, '1111'=+20 dB) may be used as the above-described bit string. Or, alternatively, a modulation and coding scheme to be determined from the measurement results may be represented. In this example, '0000' is associated with the slot #0, and '1111' is associated with the slot #15. Note that a correspondence relationship between the slot number and the CQI may be arbitrarily set.

Figure 8:
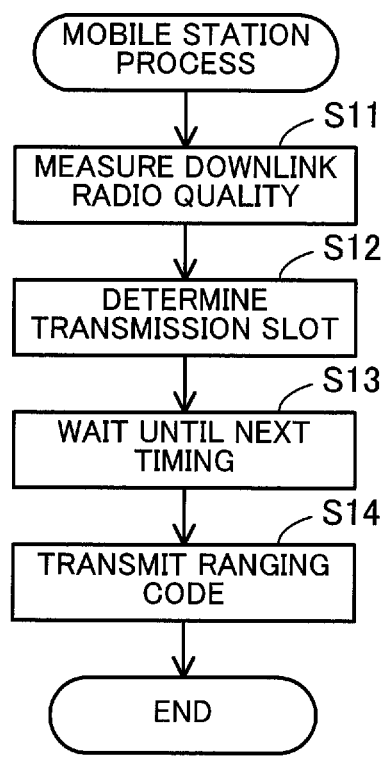
FIG. 8 is a flowchart illustrating a mobile station process according to a first embodiment.

FIG. 8 is a flowchart illustrating a mobile station process according to the first embodiment. Here, think of a case where the mobile station 200 transmits the ranging code for the periodic ranging to the base station 100. The process illustrated in FIG. 8 includes the following steps:

(Step S11) The reception processor 213 extracts a preamble of the radio frame received from the base station 100. The measurement unit 221 measures the downlink radio quality from the preamble signal, and determines the CQIs corresponding to the measurement results.

(Step S12) The determination unit 222 refers to information (e.g., the same table as the above-described slot definition table 120a) stored in the storage unit 220, and designates a slot number corresponding to the CQI determined at step S11. Then, the unit 222 determines a slot with the designated number as a slot for transmitting the ranging code.

(Step S13) The band management unit 223 waits until the next timing for the periodic ranging. The timing for the periodic ranging is previously specified, for example, by the control parameters received from the base station 100. In the timing for its periodic ranging, the unit 223 refers to the UL-MAP, and confirms that the ranging region for the periodic ranging is formed in the uplink subframe.

(Step S14) The transmission processor 219 transmits the ranging code in the slot determined at step S12. The usable ranging code is previously specified, for example, by the control parameters received from the base station 100.

As can be seen from the above sequence, the mobile station 200 periodically transmits the ranging code to the base station 100, and adjusts the transmission power and the transmission timing. On that occasion, when selecting the slot used for transmission, the mobile station 200 can inform the base station 100 of the downlink radio quality. The mobile station 200 selects the slot according to the measurement result of step S11 at step S12. However, the mobile station 200 can also select the slot according to a difference between this time and previous time in the informed measurement result. For example, when the informed CQIs of the previous time is '0101(5)' and the informed CQIs of this time is '1000(8)', the mobile station 200 can also select the slot according to the difference '3'.

Figure 9:
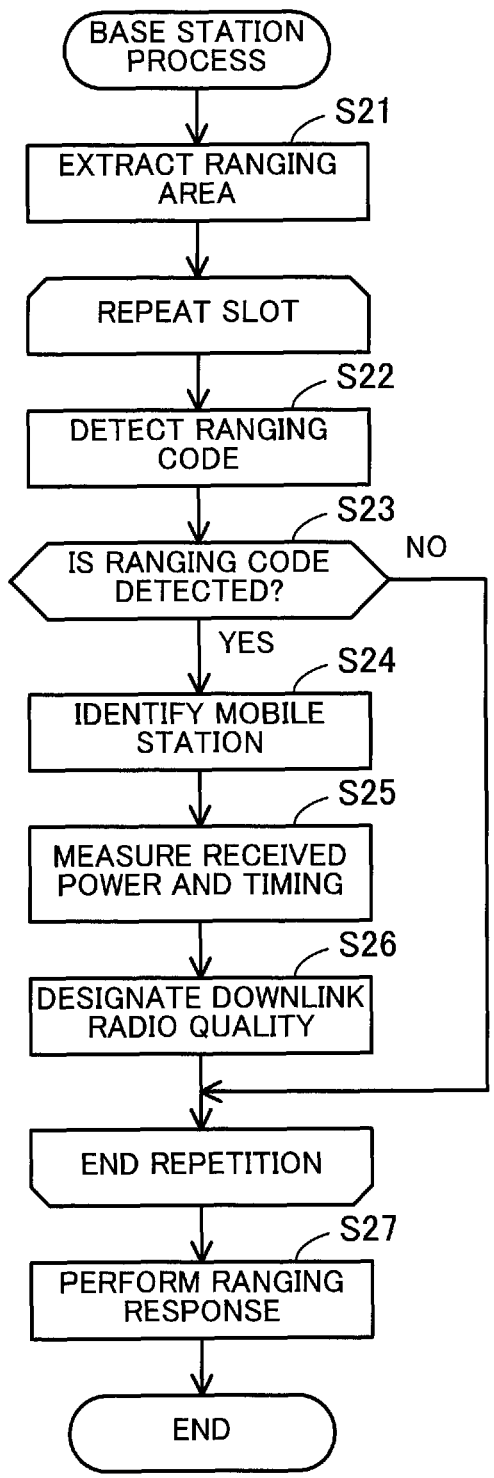
FIG. 9 is a flowchart illustrating a base station process according to the first embodiment.

FIG. 9 is a flowchart illustrating a base station process according to the first embodiment. The process illustrated in FIG. 9 includes the following steps:

(Step S21) The identification unit 114 extracts the ranging region for the uplink subframe. Processings of the following steps S22 to S26 are performed in each slot formed in the area for the periodic ranging.

(Step S22) The extraction unit 121 refers to the allocation information of the ranging code stored in the storage unit 120, and detects the ranging codes allocated to the mobile stations 200, 200a, and 200b.

(Step S23) The extraction unit 121 determines whether to detect the ranging code. If the unit 121 can detect at least one of the ranging codes, the process proceeds to step S24. If not, the process is performed with regard to the next slot. In addition, the unit 121 may detect a plurality of ranging codes in one slot. In that case, processings of the following steps S24 to S26 are performed in each ranging code.

(Step S24) The extraction unit 121 refers to the allocation information of the ranging code stored in the storage unit 120, and designates the mobile station as the transmission source of the detected ranging code.

(Step S25) The extraction unit 121 measures the received power level and the received timing based on the ranging code. The transmission controller 123 compares the measured received power level and received timing with the preferable received power level and received timing for the base station 100. Then, the unit 121 determines the adjustment amount of the transmission power and transmission timing of the mobile station designated at step S24.

(Step S26) The extraction unit 121 refers to the slot definition table 120a stored in the storage unit 120, and designates the CQI corresponding to the slot in which the ranging code is detected. The modulation scheme controller 122 determines a modulation scheme applied to the mobile station designated at step S24 according to the CQIs. In addition, the designated CQIs may be used for further utilizing.

(Step S27) The transmission controller 123 transmits the control parameters including the adjustment amount of the transmission power and transmission timing determined at step S25 as a ranging response (RNG-RSP) for the ranging code. The controller 123 transmits the ranging response, for example, in the timing after the number of predetermined frames from the radio frame in which the ranging code is received.

As can be seen from the above sequence, the base station 100 causes the mobile stations 200, 200a, and 200b to periodically transmit the ranging code and adjust the transmission power and the transmission timing. On that occasion, when designating the slot used for transmission of the ranging code, the base station 100 can know the downlink radio quality. When the slot number indicates the difference between this time and previous time in the informed downlink radio quality, the base station 100 designates the CQIs of this time in consideration of the CQIs of the previous time at step S26.

Figure 10:
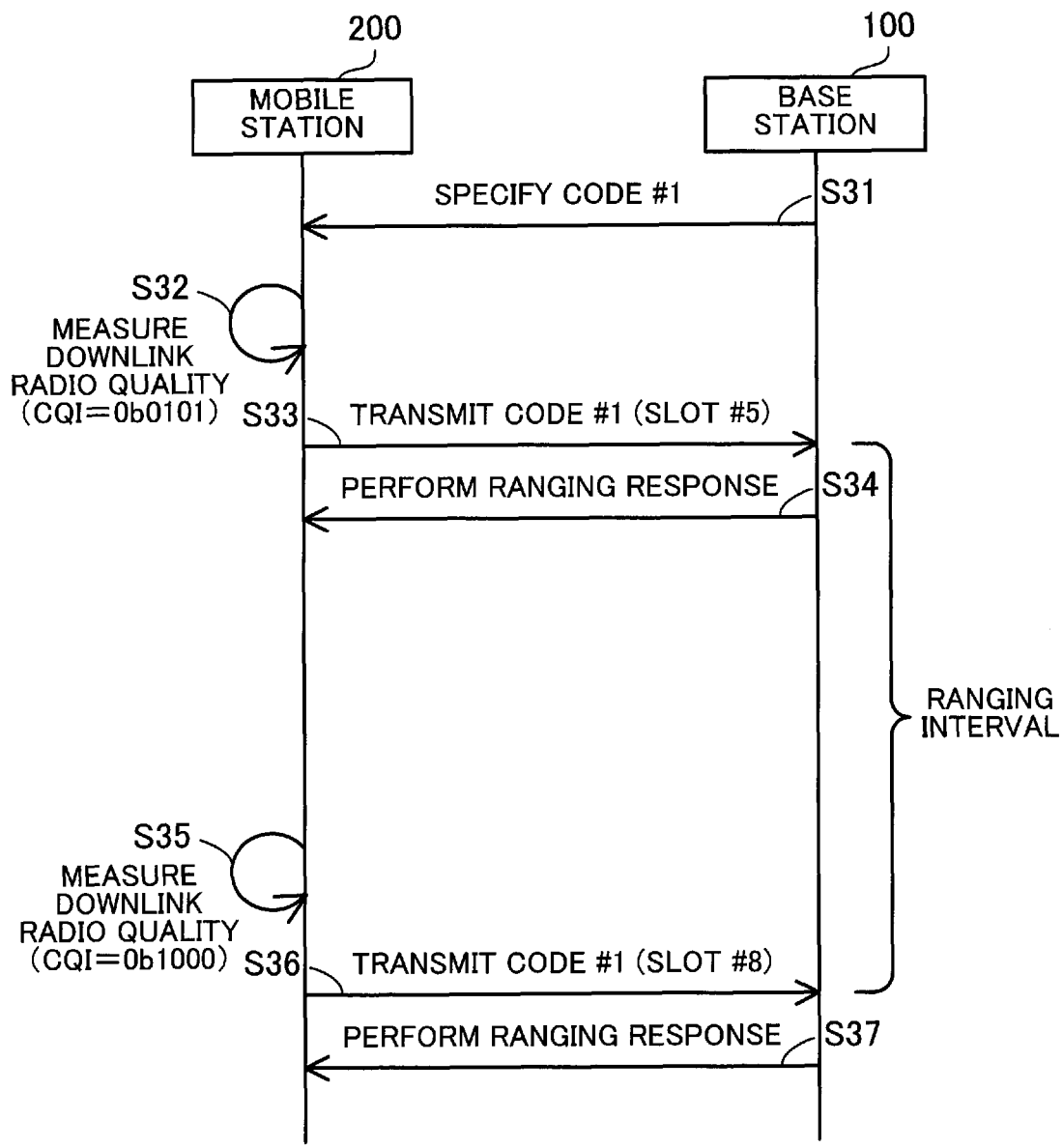
FIG. 10 is a sequence diagram illustrating a flow of messages according to the first embodiment.

FIG. 10 is a sequence diagram illustrating a flow of messages according to the first embodiment. Here, think of the communication between the base station 100 and the mobile station 200. The process illustrated in FIG. 10 includes the following steps:

(Step S31) The base station 100 allocates a code #1 as the ranging code to the mobile station 200, and notifies it of that allocation. The base station 100 may notify the mobile station 200 of the ranging code along with notification of the timing of the periodic ranging, or separately therefrom. Then, the base station 100 may change the ranging code to be allocated and the timing of the periodic ranging.

(Step S32) The mobile station 200 measures the downlink radio quality based on the received signal (e.g., the preamble signal) from the base station 100. Suppose here that CQI='0101(5)' is determined from the measurement results.

(Step S33) In the next timing of the periodic ranging, the mobile station 200 transmits the code #1 allocated to itself in the slot #5 (slot corresponding to the CQI='0101') in the ranging region.

(Step S34) The base station 100 designates the mobile station 200 as the transmission source from the code #1, and performs the ranging response. Further, the base station 100 knows CQIs='0101' from the slot #5. The mobile station 200 adjusts the transmission power and the transmission timing according to the ranging response from the base station 100.

(Step S35) The mobile station 200 measures the downlink radio quality based on the received signal from the base station 100 in the same manner as in step S32. Here, CQI='1000(8)' is supposed to be determined from the measurement result.

(Step S36) In the next timing of the periodic ranging, the mobile station 200 transmits the code #1 allocated to itself in the slot #8 (slot corresponding to the CQI='1000') in the ranging region.

(Step S37) The base station 100 designates the mobile station 200 as the transmission source from the code #1, and performs the ranging response. Further, the base station 100 knows the CQI='1000' from the slot #8. The mobile station 200 adjusts the transmission power and the transmission timing according to the ranging response from the base station 100.

As can be seen from the above sequence, the mobile station 200 can inform the base station 100 of the CQIs along with the periodic ranging. An interval of the periodic ranging may be determined statistically. Or, alternatively, it may be determined dynamically according to movement conditions of the mobile stations 200, 200a, and 200b. Further, it may be different from each other in each mobile station. An interval can be set to, for example, 1000 msec or 100 msec. In addition, the mobile station 200 can inform the base station 100 of the CQIs by using an interval different from that of the periodic ranging.

Figure 11:
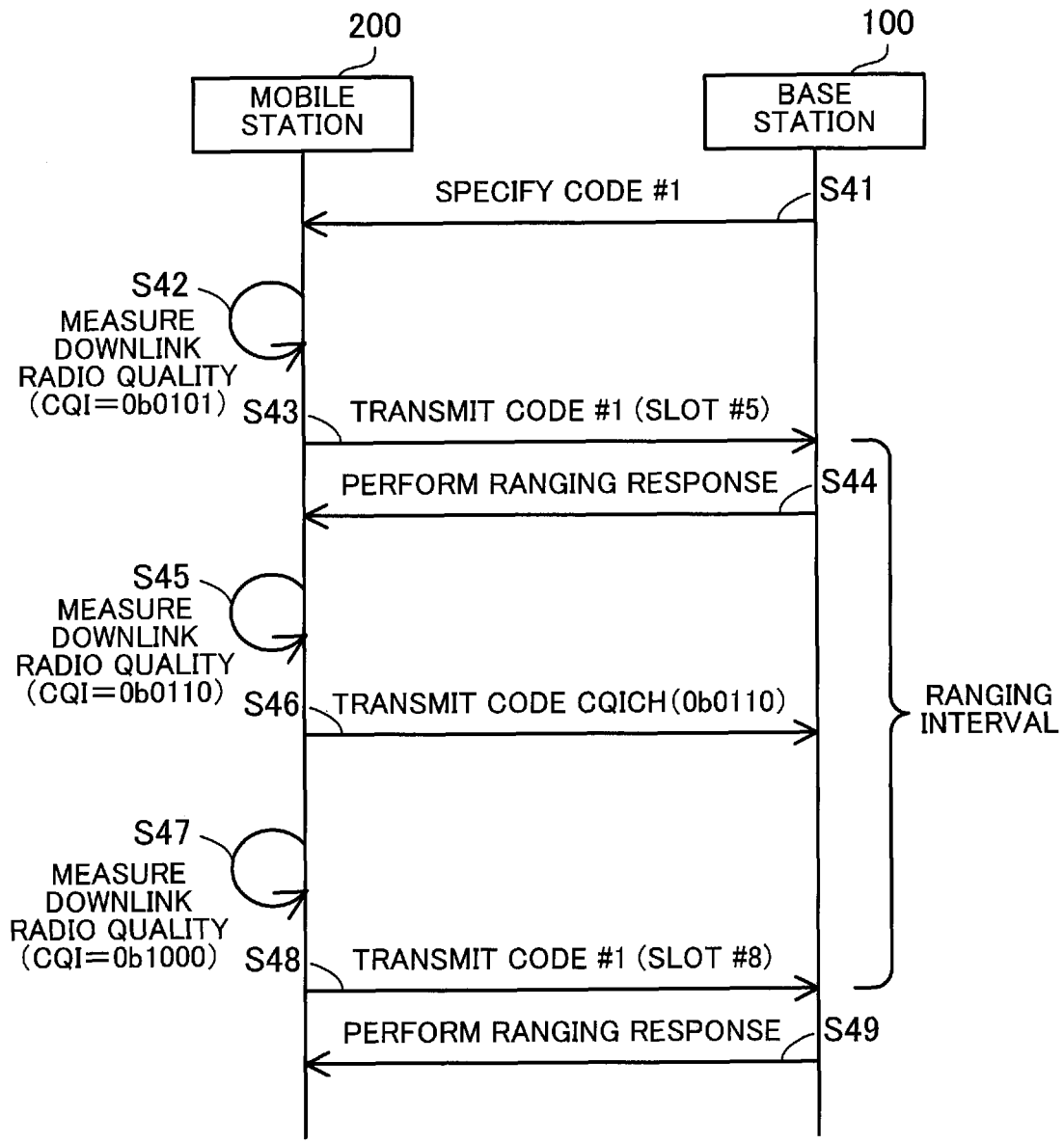
FIG. 11 is another sequence diagram illustrating a flow of messages according to the first embodiment.

FIG. 11 is another sequence diagram illustrating a flow of messages according to the first embodiment. Think of the communication between the base station 100 and the mobile station 200 in the same manner as in FIG. 10. The process illustrated in FIG. 11 includes the following steps:

(Step S41) The base station 100 allocates the code #1 as the ranging code to the mobile station 200, and informs it of that allocation.

(Step S42) The mobile station 200 measures the downlink radio quality based on the received signal (e.g., the preamble signal) from the base station 100. Suppose here that the CQI='0101(5)' is determined from the measurement result.

(Step S43) In the next timing of the regular ranging, the mobile station 200 transmits the code #1 allocated to itself in the slot #5 (slot corresponding to the CQI='0101') in the ranging region.

(Step S44) The base station 100 designates the mobile station 200 as the transmission source from the code #1, and performs the ranging response. Further, the base station 100 knows the CQI='0101' from the slot #5. The mobile station 200 adjusts the transmission power and the transmission timing according to the ranging response from the base station 100.

(Step S45) The mobile station 200 measures the downlink radio quality based on the received signal from the base station 100 in the same manner as in step S42. Here, the CQI='0110(6)' is supposed to be determined from the measurement results.

(Step S46) The mobile station 200 informs the base station 100 of the CQIs determined at step S45 by using a CQI channel (CQICH) in the feedback channel. In the CQICH, for example, four slots of three symbols×one subchannel are formed. The mobile station 200 uses any one of the slots in the CQICH. The base station 100 receives the CQICH, and knows the CQI='0110'.

(Step S47) The mobile station 200 measures the downlink radio quality based on the received signal from the base station 100 in the same manner as in steps S42 and S45. Suppose here that the CQI='1000(8)' is determined from the measurement results.

(Step S48) In the next timing of the periodic ranging, the mobile station 200 transmits the code #1 allocated to itself in the slot #8 (slot corresponding to the CQI='1000') in the ranging region.

(Step S49) The base station 100 designates the mobile station 200 as the transmission source from the code #1, and performs the ranging response. Further, the base station 100 knows the CQI='1000' from the slot #8. The mobile station 200 adjusts the transmission power and the transmission timing according to the ranging response from the base station 100.

As can be seen from the above sequence, the mobile station 200 can inform the base station 100 of the CQIs by using the ranging region, and at the same time, by using the feedback channel. In other words, the mobile station 200 can inform the base station 100 of the CQIs by using the feedback channel also in the timing except the timing for performing the periodic ranging. In an example of FIG. 11, the mobile station 200 informs the base station 100 of the CQIs alternately by using the ranging region and the feedback channel. The above-described way is particularly effective when fluctuation in the radio quality is large and the CQIs are expected to be informed in a short interval. In addition, when the CQIs are informed by using the feedback channel, the base station 100 does not need to perform the ranging process. Therefore, there is suppressed the process burden of the base station 100 due to the fact that the CQIs are informed in a short interval.

The first embodiment provides a mobile communication system in which the downlink radio quality can be transmitted from the mobile stations 200, 200a, and 200b to the base station 100 at the same time when performing the periodic ranging. Since the downlink radio quality can be identified from the slot for transmission of the ranging code, a radio resource for transmitting the downlink radio quality can be saved. These features of the present embodiment permit the mobile stations 200, 200a, and 200b to effectively inform the base station 100 of the downlink radio quality, and enjoy an increased throughput of the data transmission to it.

Second Embodiment

A second embodiment of the present invention will now be described below in detail with reference to the accompanying drawings. Since the second embodiment shares some elements with the foregoing first embodiment, the following discussion will focus on their distinctive points, omitting explanations of similar elements. The mobile communication system of the second embodiment can perform a band request at the same time when performing the periodic ranging. The mobile communication system according to the second embodiment can be implemented with a system configuration similar to the one that has been illustrated and discussed in FIG. 2 for the first embodiment. The base station and mobile station according to the second embodiment can also be implemented with a module configuration similar to the ones that have been illustrated and discussed in FIGS. 3 and 4 for the first embodiment. Where appropriate, the following description of the second embodiment will use the same reference numerals as those used in FIGS. 2 to 4.

FIG. 12 illustrates a second data structure example of the slot definition table. The slot definition table 120b is stored in the storage unit 120 of the base station 100. In addition, the same table as the slot definition table 120b is stored also in the storage unit 220 of the mobile station 200. On the slot definition table 120b, items of the slot number and the request size are provided.

In the item of the slot number, a number for identifying the slot formed in the ranging region is set. In the item of the request size, a value (e.g., the number of bytes) indicating a size of the uplink radio resource to be requested is set. Or, a value illustrating the data amount of the SDU packet and the number of the SDU packets expected to be transmitted at the mobile station as a request source may be set. In this example, '100 bytes' are associated with the slot #1, and '1500 bytes' are associated with the slot #15. The slot #0 means that the band is not requested. Note that the correspondence relationship between the slot number and the request size may be arbitrarily set.

Figure 13:
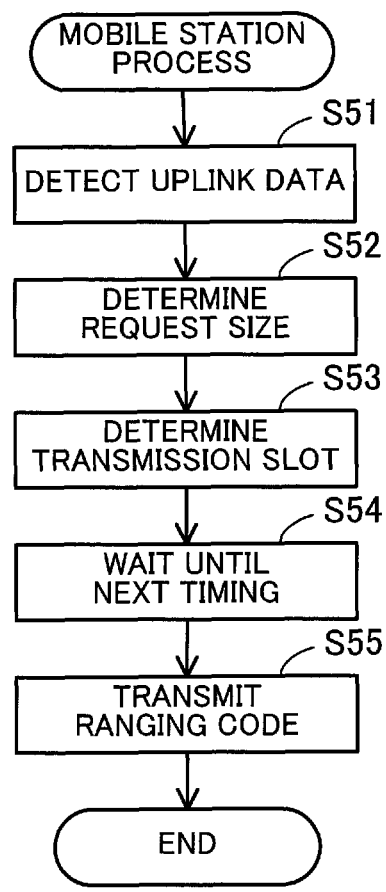
FIG. 13 is a flowchart illustrating the mobile station process according to a second embodiment.

FIG. 13 is a flowchart illustrating a mobile station process according to the second embodiment. Here, think of the mobile communication system in which the mobile station 200 transmits the ranging code to the base station 100 for performing the periodic ranging. The process illustrated in FIG. 13 includes the following steps:

(Step S51) The determination unit 222 confirms the SDU packet expected to be transmitted and held by the transmission data buffer 217. When one or more SDU packets expected to be transmitted are held, the unit 222 confirms the total amount of the data.

(Step S52) The determination unit 222 determines a size (e.g., the number of bytes) of the uplink radio resource to be requested to the base station 100 according to the total amount of the data of the SDU packet confirmed at step S51. When the uplink radio resource is not requested, the request size is supposed to be equal to zero. When determining the request size, a size of a header to be imparted at the time of generating the PDU packet is also considered.

(Step S53) The determination unit 222 refers to information (e.g., the same table as the above-described slot definition table 120*b*) stored in the storage unit 220, and designates the slot number corresponding to the request size determined at step S52. When the uplink radio resource is not requested, the unit 222 designates the slot number corresponding to the request size=0. Then, the unit 222 determines the slot with the designated number as the slot for transmitting the ranging code.

(Step S54) The band management unit 223 waits until the next timing of the periodic ranging. In the timing of its periodic ranging, the unit 223 refers to the UL-MAP, and confirms that the ranging region for the periodic ranging is formed in the uplink subframe.

(Step S55) The transmission processor 219 transmits the ranging code in the slot determined at step S53. The usable ranging code is previously specified, for example, by the control parameters received from the base station 100.

With the above steps, the mobile station 200 periodically transmits the ranging code to the base station 100, and adjusts the transmission power and the transmission timing. On that occasion, when selecting the slot for transmission, the mobile station 200 can inform the base station 100 of a size of the uplink radio resource to be requested. In addition, the mobile station 200 selects the slot corresponding to the request size at step S53. However, the mobile station 200 can also select the slot according to a difference between the request size of this time and that of the previous time.

Figure 14:
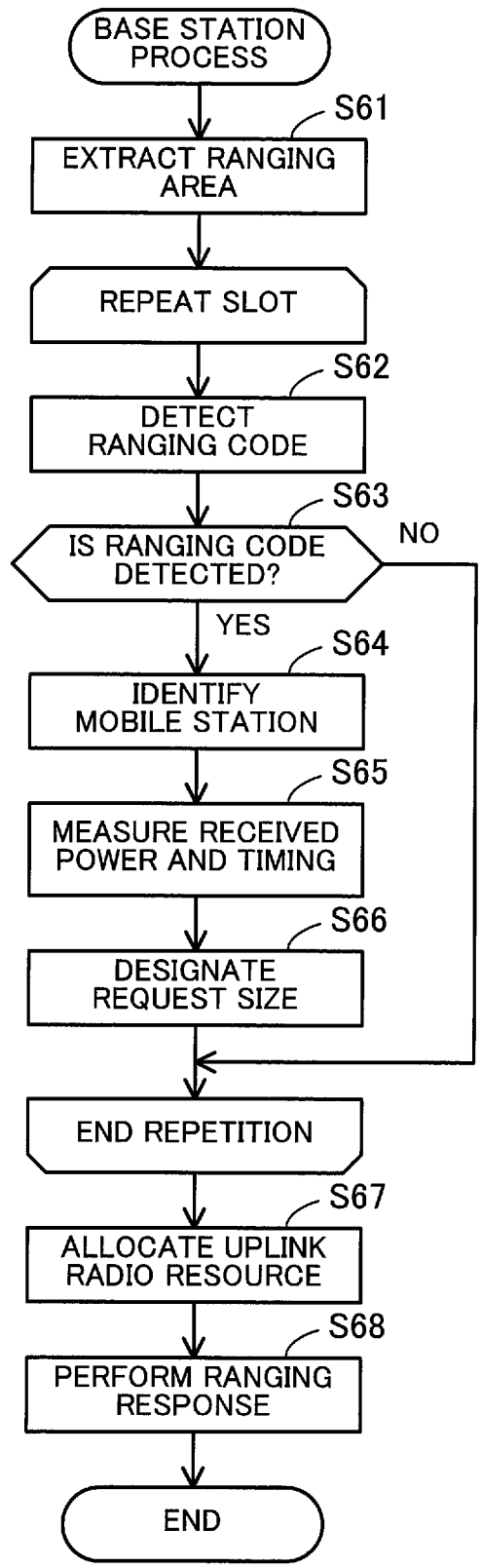
FIG. 14 is a flowchart illustrating the base station process according to the second embodiment.

FIG. 14 is a flowchart illustrating a base station process according to the second embodiment. The process illustrated in FIG. 14 includes the following steps:

(Step S61) The identification unit 114 extracts a ranging region of the uplink subframe. The processing of the following steps S62 to S66 is performed in each slot formed in the area for the periodic ranging.

(Step S62) The extraction unit 121 refers to the allocation information of the ranging code stored in the storage unit 120, and detects the ranging codes allocated to the mobile stations 200, 200*a*, and 200*b*.

(Step S63) The extraction unit 121 determines whether to detect the ranging code. If the unit 121 can detect at least one of the ranging codes, the process proceeds to step S64. If not, the process is performed with respect to the next slot.

(Step S64) The extraction unit 121 refers to the allocation information of the ranging code stored in the storage unit 120, and designates the mobile station as the transmission source of the detected ranging code.

(Step S65) The extraction unit 121 measures the received power level and the received timing based on the ranging code. The transmission controller 123 determines the adjustment amount of the transmission power and the transmission timing based on the measured received power level and received timing.

(Step S66) The extraction unit 121 refers to the slot definition table 120*b* stored in the storage unit 120, and designates the request size of the uplink radio resource corresponding to the slot in which the ranging code is detected.

(Step S67) The band request management unit 124 allocates a radio resource of the UL burst to each mobile station designated at step S64 according to the request size designated at step S66. Note that in the case of the request size=0, the unit 124 does not need to perform the allocation. As a result of adjusting band requests from the plurality of mobile stations, the radio resources of a size smaller than the requested size are considered to be allocated. Alternatively, the subsequent radio resources of the radio frame are also considered to be allocated.

(Step S68) The transmission controller 123 transmits as a RNG-RSP the control parameters including the adjustment amount of the transmission power and transmission timing determined at step S65.

Through the above steps, the base station 100 causes the mobile stations 200, 200*a*, and 200*b* to periodically transmit the ranging code, and adjust the transmission power and the transmission timing. On that occasion, when designating the slot used for transmitting the ranging code, the base station 100 can know a size of the uplink radio resource requested by the mobile stations 200, 200*a*, and 200*b*. In addition, when the slot number indicates a difference between the request size of this time and that of the previous time, the base station 100 designates the request size of this time also in consideration of that of the previous time at step S66.

Figure 15:
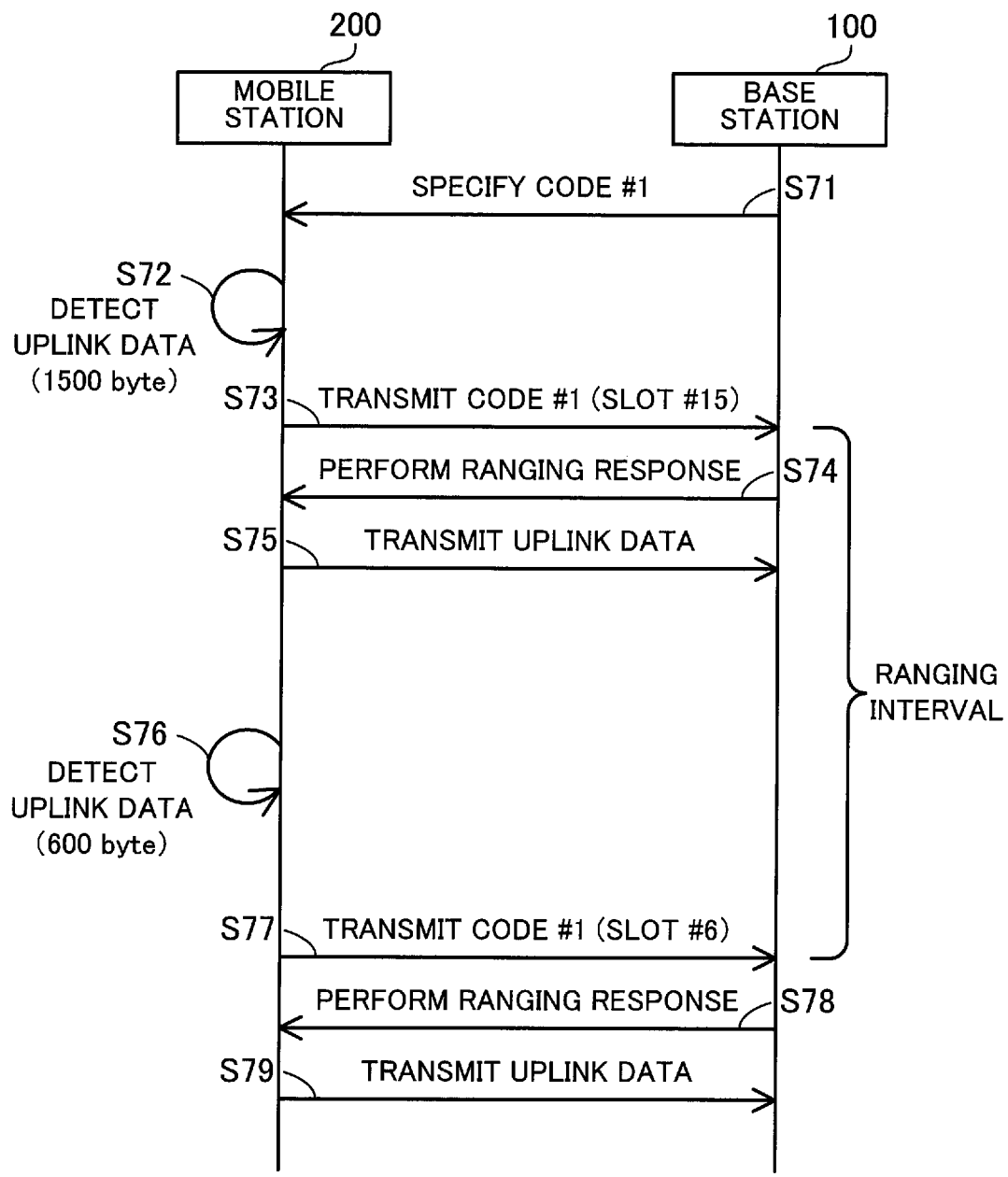
FIG. 15 is a sequence diagram illustrating a flow of messages according to the second embodiment.

FIG. 15 is a sequence diagram illustrating a flow of messages according to the second embodiment. Here, think of communication between the base station 100 and the mobile station 200. The process illustrated in FIG. 15 includes the following steps:

(Step S71) The base station 100 allocates the code #1 to the mobile station 200 as the ranging code, and notifies it of that allocation.

(Step S72) The mobile station 200 detects uplink transmission data, and determines a size of the uplink radio resource to be requested to the base station 100. Here, the request size='1500 bytes' is supposed to be determined.

(Step S73) In the next timing of the periodic ranging, the mobile station 200 transmits the code #1 allocated to itself in the slot #15 (slot according to the request size='1500 bytes') in the ranging region.

(Step S74) The base station 100 designates the mobile station 200 as the transmission source from the code #1, and performs the RNG-RSP. Further, the base station 100 knows the request size='1500 bytes' from the slot #15, and allocates a radio resource of the UL burst to the mobile station 200. The mobile station 200 adjusts the transmission power and the transmission timing according to the RNG-RSP from the base station 100.

(Step S75) The mobile station 200 transmits the data detected at step S72 by using the uplink radio resource allocated from the base station 100. When referring to the UL-MAP of the downlink subframe, for example, the mobile station 200 can know that the uplink radio resource is allocated by the base station 100.

(Step S76) In the same manner as in step S72, the mobile station 200 detects the uplink transmission data, and determines a size of the uplink radio resource to be requested to the base station 100. Here, the request size='600 bytes' is supposed to be determined.

(Step S77) In the next timing of the periodic ranging, the mobile station 200 transmits the code #1 allocated to itself in the slot #6 (slot corresponding to the request size='600 bytes') in the ranging region.

(Step S78) The base station 100 designates the mobile station 200 as the transmission source from the code #1, and performs the RNG-RSP. Further, the base station 100 knows the request size='600 bytes' from the slot #6, and allocates a radio resource of the UL burst to the mobile station 200. The mobile station 200 adjusts the transmission power and the transmission timing according to the RNG-RSP from the base station 100.

(Step S79) The mobile station 200 transmits the data detected at step S76 by using the uplink radio resource allocated from the base station 100.

As can be seen from the above sequence, the mobile station 200 can perform a band request to the base station 100 along with the periodic ranging. An interval of the periodic ranging may be determined statistically. Or, alternatively, it may be determined dynamically according to movement conditions of the mobile stations 200, 200a, and 200b. Further, it may be different from each other in each mobile station.

The second embodiment provides a mobile communication system in which the mobile stations 200, 200a, and 200b can perform the band request to the base station 100 at the same time when performing the periodic ranging. Since the request size can be designated from the slot for transmission of the ranging code, the radio resources can be saved. These features of the present embodiment permit the mobile stations 200, 200a, and 200b to effectively perform the band request, and enjoy an increased throughput of the data transmission to the base station 100.

Third Embodiment

A third embodiment of the present invention will now be described below in detail with reference to the accompanying drawings. Since the third embodiment shares some elements with the foregoing first and second embodiments, the following discussion will focus on their distinctive points, omitting explanations of similar elements. The mobile communication system according to the third embodiment can perform both of information on the downlink radio quality and the band request by using the ranging region. The mobile communication system according to the third embodiment can be implemented with a system configuration similar to the one that has been illustrated and discussed in FIG. 2 for the first embodiment. The base station and mobile stations according to the third embodiment can also be implemented with a module configuration similar to the ones that have been illustrated and discussed in FIGS. 3 and 4 for the first embodiment. Where appropriate, the following description of the third embodiment will use the same reference numerals as those used in FIGS. 2 to 4.

The mobile stations 200, 200a, and 200b can feed back the radio quality by using the ranging region in the timing for performing the regular ranging. On the other hand, the mobile stations 200, 200a, and 200b can perform the band request by using the ranging region in the remaining timing except the timing for performing the periodic ranging. The storage unit 120 of the base station 100 stores, for example, the above-described slot definition tables 120a and 120b. Also, the mobile stations 200, 200a, and 200b store the same tables.

Figure 16:
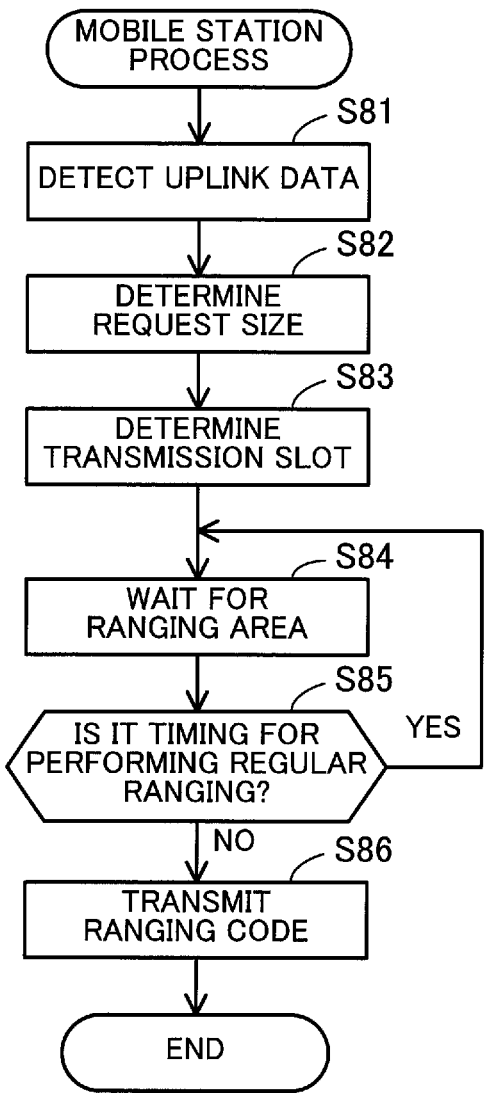
FIG. 16 is a flowchart illustrating the mobile station process according to a third embodiment.

FIG. 16 is a flowchart illustrating a mobile station process according to the third embodiment. This process is performed in parallel with the mobile station process (process of informing the base station of the CQIs) according to the first embodiment of FIG. 8. The process illustrated in FIG. 16 includes the following steps:

(Step S81) The determination unit 222 confirms the SDU packet expected to be transmitted and held by the transmission data buffer 217. When the buffer 217 holds one or more SDU packets expected to be transmitted, the unit 222 confirms the total amount of the data.

(Step S82) The determination unit 222 determines a size of the uplink radio resource to be requested to the base station 100 according to the total amount of the data of the SDU packet confirmed at step S81.

(Step S83) The determination unit 222 refers to information stored in the storage unit 220, and designates the slot number corresponding to the request size determined at step S82. Further, the unit 222 determines the slot with the designated number as the slot for transmitting the ranging code.

(Step S84) The band management unit 223 waits until the next timing of the ranging region. The unit 223 refers to the UL-MAP, and confirms that the ranging region for the periodic ranging is formed in the uplink subframe.

(Step S85) The band management unit 223 determines whether the present timing is timing for performing the periodic ranging of itself. If so, the process then returns to step S84. If not, the process proceeds to step S86.

(Step S86) The transmission processor 219 transmits the ranging code in the slot determined at step S83.

With the above steps, when selecting the slot according to the CQIs during the periodic ranging, the mobile station 200 can inform the base station 100 of the CQIs. On the other hand, when selecting the slot according to the request size in the remaining timing except the timing for performing the periodic ranging, the mobile station 200 can perform the band request to the base station 100.

When the transmission data is absent, the transmission processor 219 may transmit the ranging code in the slot corresponding to the request size=0, or does not need to transmit the ranging code. The ranging code that means the band request may be transmitted only in the timing including conditions specified by the base station 100, or in the arbitrary timing except the periodic ranging. The timing of the periodic ranging may be common to all the mobile stations, or different in each mobile station.

Figure 17:
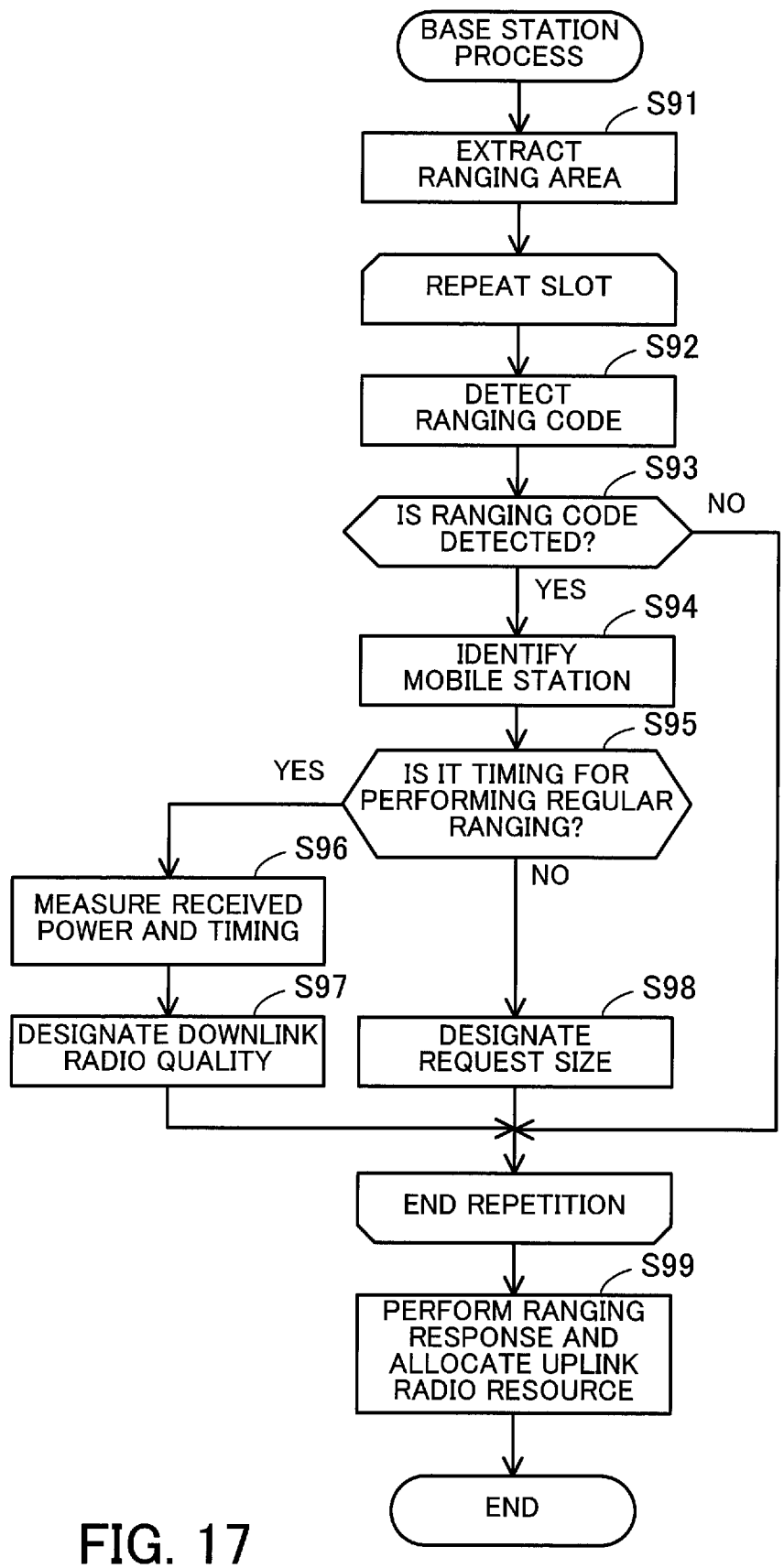
FIG. 17 is a flowchart illustrating the base station process according to the third embodiment.

FIG. 17 is a flowchart illustrating a base station process according to the third embodiment. The process illustrated in FIG. 17 includes the following steps:

(Step S91) The identification unit 114 extracts the ranging region of the uplink subframe. The processing of the following steps S92 to S98 is performed in each slot formed in the ranging region.

(Step S92) The extraction unit 121 refers to the allocation information of the ranging code stored in the storage unit 120, and detects the ranging codes allocated to the mobile stations 200, 200a, and 200b.

(Step S93) The extraction unit 121 determines whether to detect the ranging codes. If the unit 121 can detect at least one of the ranging codes, the process proceeds to step S94. If not, the process is performed with respect to the next slot.

(Step S94) The extraction unit 121 refers to the allocation information of the ranging codes stored in the storage unit 120, and designates the mobile station as the transmission source of the detected ranging code.

(Step S95) The extraction unit 121 determines whether the present timing is timing for performing the regular ranging of the mobile station designated at step S94. If so, the process advances to step S96. If not, the process proceeds to step S98.

(Step S96) The extraction unit 121 measures the received power level and the received timing based on the ranging code. The transmission controller 123 determines the adjustment amount of the transmission power and the transmission timing based on the measured received power level and received timing.

(Step S97) The extraction unit 121 refers to the slot definition table 120a stored in the storage unit 120, and designates the CQI corresponding to the slot in which the ranging code is detected. The modulation scheme controller 122 determines a modulation scheme according to the CQIs.

(Step S98) The extraction unit 121 refers to the slot definition table 120b stored in the storage unit 120, and designates a request size of the uplink radio resource corresponding to the slot in which the ranging code is detected.

(Step S99) The transmission controller 123 transmits control parameters including the adjustment amount of the transmission power and transmission timing determined at step S96 as the RNG-RSP. Further, the band request management unit 124 allocates a radio resource of the UL burst according to the request size designated at step S98.

Through the above steps, when detecting the ranging code, the base station 100 designates the mobile station as the transmission source and the slot number. If the present timing is timing for performing the periodic ranging for the mobile station as the transmission source, the base station 100 interprets that the slot number means the CQI, and at the same time, performs the ranging process. On the other hand, if the present timing is not the timing for performing the periodic ranging for the mobile station as the transmission source, the base station 100 interprets that the slot number means a request size of the band request, and allocates the UL burst to the mobile station. In addition, the base station 100 can perform the ranging process also in the remaining timing except the timing for performing the periodic ranging.

Figure 18:
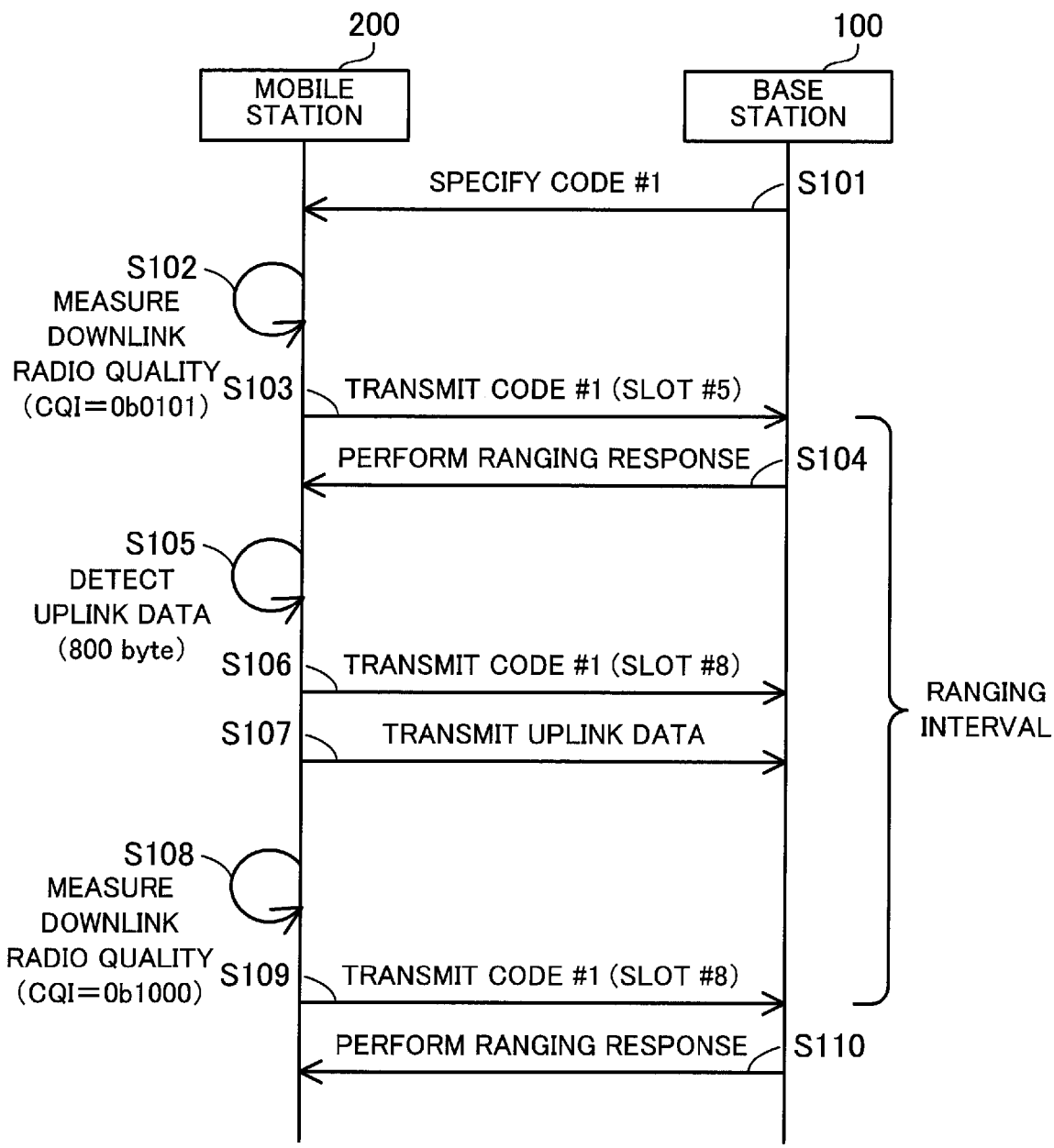
FIG. 18 is a sequence diagram illustrating a flow of messages according to the third embodiment.

FIG. 18 is a sequence diagram illustrating a flow of messages according to the third embodiment. In this example, one area for the periodic ranging is supposed to be set every two frames, and the mobile station 200 is supposed to perform the periodic ranging at a rate of once every ten frames. More specifically, the mobile station 200 performs the periodic ranging at a rate of once every five areas for the periodic ranging. The process illustrated in FIG. 18 includes the following steps:

(Step S101) The base station 100 allocates the code #1 as the ranging code to the mobile station 200, and notifies it of that allocation. Also, the base station 100 notifies the mobile station 200 of the timing for performing the regular ranging with a 10 frame interval.

(Step S102) Based on the received signal from the base station 100, the mobile station 200 measures the downlink radio quality. Suppose here that the CQI='0101(5)' is determined from the measurement results.

(Step S103) In the next timing for performing the periodic ranging of itself, the mobile station 200 transmits the allocated code #1 in the slot #5 (slot corresponding to the CQI='0101') in the ranging region.

(Step S104) The base station 100 designates the mobile station 200 as the transmission source from the code #1, and performs the RNG-RSP. Further, the base station 100 knows the CQI='0101' from the slot #5. The mobile station 200 adjusts the transmission power and the transmission timing according to the RNG-RSP from the base station 100.

(Step S105) The mobile station 200 detects the uplink transmission data, and determines a size of the uplink radio resource to be requested to the base station 100. Suppose here that the request size='800 bytes' is determined.

(Step S106) In remaining frames except the frame to perform the periodic ranging through the mobile station 200 among the frames in which the base station 100 sets an area for the periodic ranging, the mobile station 200 transmits the allocated code #1 to the base station 100 in the slot #8 (slot corresponding to the request size='800 bytes') in the ranging region.

(Step S107) The base station 100 designates the mobile station 200 as the transmission source from the code #1. At the same time, the base station 100 knows the request size='800 bytes' from the slot #8, and allocates the radio resource of the UL burst to the mobile station 200. The mobile station 200 uses the uplink radio resource allocated by the base station 100, and transmits the data detected at step S105 to it.

(Step S108) In the same manner as in step S102, the mobile station 200 measures the downlink radio quality based on the received signals from the base station 100. Suppose here that the CQI='1000(8)' is determined from the measurement results.

(Step S109) In the next timing for performing the periodic ranging of itself, the mobile station 200 transmits the allocated code #1 to the base station 100 in the slot #8 (slot corresponding to the CQI='1000') in the ranging region.

(Step S110) The base station 100 designates the mobile station 200 as the transmission source from the code #1, and performs the RNG-RSP. Further, the base station 100 knows the CQI='1000' from the slot #8. The mobile station 200 adjusts the transmission power and the transmission timing according to the RNG-RSP from the base station 100.

As can be seen from the above sequence, the mobile station 200 selects the slot corresponding to the CQI in the timing for performing the periodic ranging of itself, and selects the slot corresponding to a request size of the band request in the remaining timing except the above-described timing to thereby transmit the ranging code to the base station 100. The base station 100 interprets a meaning of the slot number based on the fact that the ranging code is detected in any one of the ranging regions among a plurality of ranging regions whose timing is different from each other.

The mobile station 200 may reverse the timing for informing the base station 100 of the downlink radio quality and that for performing the band request. Specifically, the mobile station 200 may also select the slot corresponding to a request size of the band request in the timing for performing the periodic ranging, and select the slot corresponding to the downlink radio quality in the remaining timing except the above-described timing. The above-described way is particularly effective when the uplink transmission data is continuously produced, or when fluctuation in the downlink radio quality is small and does not need to be regularly informed. Further, under communication conditions, the mobile station 200 may dynamically determine any one of information on the downlink radio quality and a performance of the band request in the timing for performing the periodic ranging.

The third embodiment provides the mobile communication system in which by using the ranging region, the mobile stations 200, 200a, and 200b can inform the base station 100 of the downlink radio quality and a size of the uplink radio resource to be requested. As a result, the radio resources can be saved. These features of the present embodiment permit the mobile stations 200, 200a, and 200b to effectively perform the band request, and enjoy an increased throughput of the data transmission to the base station 100.

Fourth Embodiment

A fourth embodiment of the present invention will now be described below in detail with reference to the accompanying drawings. Since the fourth embodiment shares some elements with the foregoing first to third embodiments, the following discussion will focus on their distinctive points, omitting explanations of similar elements. The mobile communication system according to the fourth embodiment can change in each mobile station the correspondence relationship between the slot number and the CQI (or the request size). The mobile communication system according to the fourth embodiment can be implemented with a system configuration similar to the one that has been illustrated and discussed in FIG. 2 for the first embodiment. The base station and mobile station according to the fourth embodiment can also be implemented with a module configuration similar to the ones that have been illustrated and discussed in FIGS. 3 and 4 for the first embodiment.

FIG. 19 illustrates a third data structure example of the slot definition table. A slot definition table group 120c is stored in the storage unit 120 of the base station 100. The same table group as the slot definition table group 120c is stored also in the storage unit 220 of the mobile station 200. A structure of each table included in the slot definition table group 120c is the same as that of the slot definition table 120a according to the first embodiment. Note that in each table, an offset is set. That is, the correspondence relationship between the slot number and the CQI is different depending on the table.

In this example, 16 ways of correspondence relationships are defined. In the table of offset=0, for example, the CQI='0000' is associated with the slot #0, and the CQI='0001' is associated with the slot #1. In the table of offset=1, the CQI='1111' is associated with the slot #0, and the CQI='0000' is associated with the slot #1. In the table of offset=15, the CQI='0001' is associated with the slot #0, and the CQI='0010' is associated with the slot #1.

To each mobile station, any one of the offsets (0 to 15) is applied. The mobile stations 200, 200a, and 200b each may refer to the tables corresponding to the offsets applied to themselves, and determine the slot for transmission of the ranging code. The base station 100 may refer to the table corresponding to the offset applied to the mobile station as the transmission source, and designate the notified CQIs. The base station 100 may determine the offsets applied to the mobile stations 200, 200a, and 200b based on other information units such as an identification number and connection ID of the ranging code. Or, alternatively, the base station 100 may arbitrarily select the offsets, and notify the mobile stations 200, 200a, and 200b of that selection.

The mobile communication system according to the fourth embodiment exerts the same effects as those of the first to third embodiments. Further, the mobile communication system according to the fourth embodiment can smooth a usage rate of the slot. As a result, the mobile communication system reduces the number of the ranging codes multiplexed in each slot and improves detection accuracy of the ranging code in the base station 100. In FIG. 19, an example of the correspondence relationship between the slot number and the CQI is illustrated; further, a plurality of ways of correspondence relationships between the slot number and the request size of the band request can also be defined similarly.

Fifth Embodiment

A fifth embodiment of the present invention will now be described below in detail with reference to the accompanying drawings. Since the fifth embodiment shares some elements with the foregoing first to fourth embodiments, the following discussion will focus on their distinctive points, omitting explanations of similar elements. The fifth embodiment provides a mobile communication system in which a plurality of slots associated with the CQIs or the request sizes of the band request are distributed and located in a plurality of radio frames. The mobile communication system according to the fifth embodiment can be implemented with a system configuration similar to the one that has been illustrated and discussed in FIG. 2 for the first embodiment. The base station and mobile stations according to the fifth embodiment can also be implemented with a module configuration similar to the ones that have been illustrated and discussed in FIGS. 3 and 4 for the first embodiment.

Figure 20:
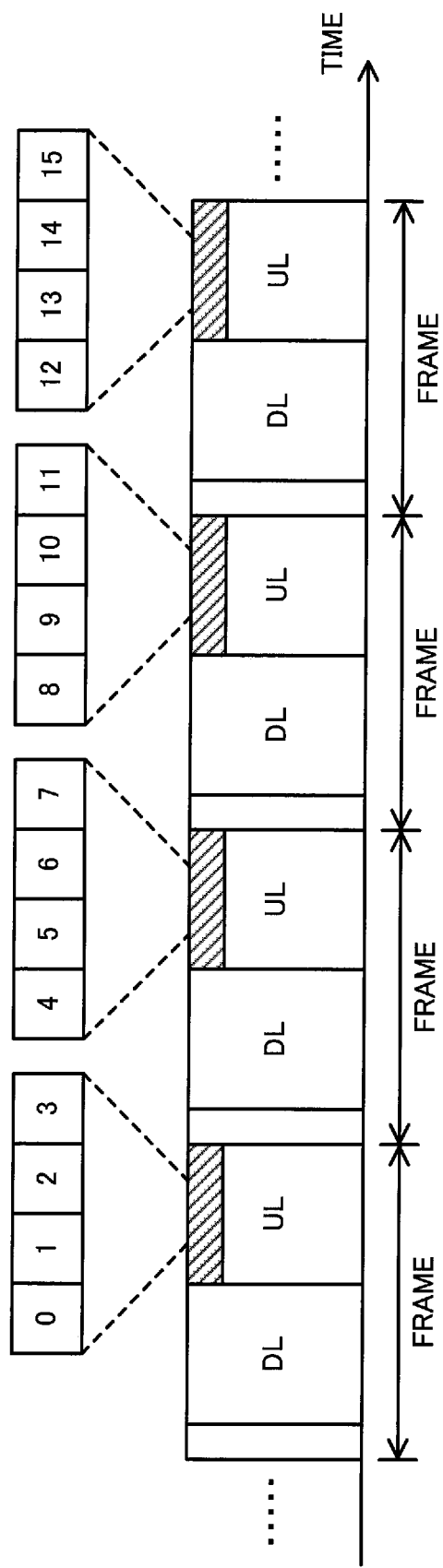
FIG. 20 illustrates a second structure example of the ranging area.

FIG. 20 illustrates a second structure example of the ranging region. In this example, 16 slots (slots #0 to #15) associated with the CQIs or the request sizes of the band request are distributed and located in four radio frames. More specifically, the slots #0 to #3 are arranged in the ranging region of a first radio frame. The slots #4 to #7 are arranged in the ranging region of a second radio frame. The slots #8 to #11 are arranged in the ranging region of a third radio frame. The slots #12 to #15 are arranged in the ranging region of a fourth radio frame.

Figure 21:
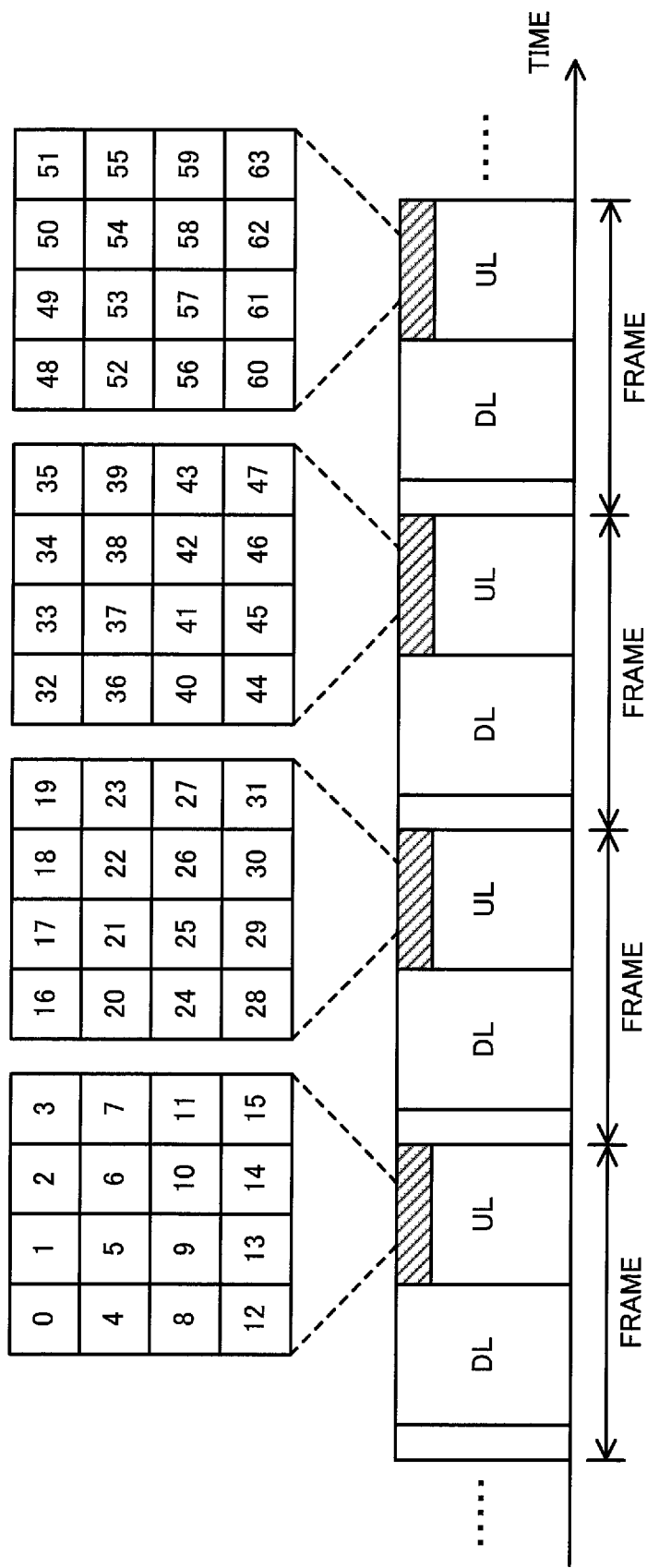
FIG. 21 illustrates a third structure example of the ranging area.

FIG. 21 illustrates a third structure example of the ranging region. In this example, 64 slots (slots #0 to #63) associated with the CQIs or the request sizes of the band request are distributed and located in four radio frames. More specifically, the slots #0 to #15 are arranged in the ranging region of a first radio frame. The slots #16 to #31 are arranged in the ranging region of a second radio frame. The slots #32 to #47 are arranged in the ranging region of a third radio frame. The slots #48 to #63 are arranged in the ranging region of a fourth radio frame.

In the examples of FIGS. 20 and 21, the number of the slots formed in the ranging region is the same in all of the radio frames; however, the number of the slots may be different from each other depending on the radio frame. Further, in the examples of FIGS. 20 and 21, the slots are arranged in four subsequent radio frames, respectively; however, the radio frame in which the slot is not arranged may be inserted into them. An arrangement method of the slots may be previously determined statistically, or changed dynamically. In the latter case, for example, one super frame is formed by using four frames. Then, control parameters in which the arrangement method of the slots is defined are also considered to be transmitted by using a head frame of each super frame.

The mobile communication system according to the fifth embodiment exerts the same effects as those of the first to fourth embodiments. Further, the mobile communication system according to the fifth embodiment can realize an appropriate communication control. For example, when the slots are distributed and arranged in a plurality of radio frames, the mobile communication system can allocate more uplink radio resources to uplink data transmission. Further, when the number of the slots associated with the CQIs or the request sizes of the band request is increased (e.g., from 16 slots to 64 slots), the mobile stations 200, 200a, and 200b can inform the base station 100 of information with higher accuracy, and realize fine communication control.

As can be seen from various embodiments discussed above, the proposed transmitting apparatus, receiving apparatus, transmitting method, and receiving method permit communication control to be effectively performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:
1. A transmitting apparatus comprising:
a processor configured to determine a correspondence between a plurality of values of an indicator and a plurality of areas included in a transmission area based on identification information of the transmitting apparatus, calculate a value of the indicator to be transmitted to a receiving apparatus, and select one of the plurality of areas according to the calculated value of the indicator and the determined correspondence; and a radio interface configured to transmit a signal to the receiving apparatus by using the area selected by the processor, wherein a first process is performed by the receiving apparatus depending on the transmitted signal and a second process different from the first process is performed by the receiving apparatus depending on the value of the indicator among the plurality of values indicated by the selected area.

2. The transmitting apparatus according to claim 1, wherein the second process includes a process of controlling a bandwidth allocated to the transmitting apparatus, and the plurality of values of the indicator are information used for controlling the bandwidth.

3. The transmitting apparatus according to claim 1, wherein the second process includes a process of controlling a modulation scheme applied to the transmitting apparatus, and the plurality of values of the indicator are information used for controlling the modulation scheme.

4. The transmitting apparatus according to claim 1, wherein the first process is a process of controlling at least one of transmission power and transmission timing of the transmitting apparatus.

5. The transmitting apparatus according to claim 1, wherein the signal is a signal capable of identifying the transmitting apparatus.

6. The transmitting apparatus according to claim 1, wherein the processor selects an area for transmitting the signal among a first area included in the transmission area and a second area included in another transmission area belonging to a frame different from that to which the transmission area belongs.

7. A transmitting apparatus comprising:
a radio interface configured to transmit a signal used to perform a first process by a receiving apparatus by using at least a predetermined first transmission area among the first transmission area and a second transmission area, the first and second transmission areas being notified through broadcast information as transmission areas for transmitting the signal; and
a controller configured to determine a correspondence between a plurality of values of an indicator and a plurality of areas included in the second transmission area based on identification information of the transmitting apparatus, calculate, when a second process different from the first process is to be performed by the receiving apparatus, a value of the indicator, select one of the plurality of areas according to the calculated value of the indicator and the determined correspondence, and control the radio interface to transmit the signal by using the selected area included in the second transmission area,
wherein the second process is performed by the receiving apparatus depending on the value of the indicator among the plurality of values indicated by the selected area.

8. The transmitting apparatus according to claim 7, wherein
the second process includes at least one of a process of controlling a band allocated to the transmitting apparatus and a process of controlling a modulation scheme applied to the transmitting apparatus.

9. A receiving apparatus comprising:
a receiver configured to receive a signal transmitted by a transmitting apparatus in one of a plurality of areas included in a transmission area; and
a processor configured to determine a correspondence between a plurality of values of an indicator and the plurality of areas based on identification information of the transmitting apparatus, specify a value of the indicator among the plurality of values according to the area in which the receiver receives the signal and the determined correspondence, perform a first process depending on the received signal, and perform a second process different from the first process depending on the specified value of the indicator among the plurality of values.

10. A receiving apparatus comprising:
a receiver configured to receive a signal transmitted by using a predetermined first transmission area and one of a plurality of areas included in a second transmission area, the first and second transmission areas being notified as transmission areas for transmitting the signal used to perform a first process; and
a processor configured to determine a correspondence between a plurality of values of an indicator and the plurality of areas based on identification information of the transmitting apparatus, specify a value of the indicator among the plurality of values according to the area included in the second transmission area in which the receiver receives the signal and the determined correspondence, perform the first process depending on the signal received in the first transmission area and perform a second process different from the first process depending on the specified value of the indicator among the plurality of values.

* * * * *